US008488188B2

(12) United States Patent
Nomura

(10) Patent No.: US 8,488,188 B2
(45) Date of Patent: Jul. 16, 2013

(54) PRINTER GRADATION CORRECTION METHOD AND COLOR PATCH IMAGE

(75) Inventor: Shoichi Nomura, Hachioji (JP)

(73) Assignee: Konica Minolta Business Technologies, Inc. (JP)

( * ) Notice: Subject to any disclaimer, the term of this patent is extended or adjusted under 35 U.S.C. 154(b) by 455 days.

(21) Appl. No.: 12/638,899

(22) Filed: Dec. 15, 2009

(65) Prior Publication Data

US 2010/0165367 A1 Jul. 1, 2010

(30) Foreign Application Priority Data

Dec. 26, 2008 (JP) ................................. 2008-332267

(51) Int. Cl.
*G06F 15/00* (2006.01)
(52) U.S. Cl.
USPC ............ 358/1.9; 358/2.1; 358/3.26; 358/504; 358/3.01; 358/1.18; 382/162; 382/165; 382/167; 382/169; 382/170
(58) Field of Classification Search
USPC ................... 358/1.9, 2.1, 505, 506, 509–518, 358/3.01, 1.18, 501, 504, 537, 426.02, 426.04, 358/448, 462–464; 382/162, 165, 167–170
See application file for complete search history.

(56) References Cited

U.S. PATENT DOCUMENTS

| | | | | |
|---|---|---|---|---|
| 5,553,166 A | * | 9/1996 | Kakutani | 382/252 |
| 6,185,007 B1 | * | 2/2001 | Hayashi et al. | 358/1.9 |
| 6,873,441 B1 | * | 3/2005 | Kuwabara et al. | 358/3.26 |
| 6,897,978 B1 | * | 5/2005 | Ohta | 358/1.9 |
| 6,982,813 B2 | * | 1/2006 | Hirata et al. | 358/1.9 |
| 7,545,536 B2 | * | 6/2009 | Hayashi | 358/1.9 |
| 7,787,786 B2 | * | 8/2010 | Nakane | 399/49 |
| 8,090,198 B2 | * | 1/2012 | Yoshii et al. | 382/167 |

(Continued)

FOREIGN PATENT DOCUMENTS

| | | |
|---|---|---|
| JP | 2001-320592 | 11/2001 |
| JP | 2004-230743 | 8/2004 |
| JP | 2005-318460 | 11/2005 |
| JP | 2008-072343 | 3/2008 |

OTHER PUBLICATIONS

Extended European Search Report for EP 09180050, mailed May 3, 2012, 6 pgs.

(Continued)

*Primary Examiner* — Benny Q Tieu
*Assistant Examiner* — Quyen V Ngo
(74) *Attorney, Agent, or Firm* — Squire Sanders (US) LLP

(57) ABSTRACT

A printer gradation correcting method, comprises the steps of: outputting a color patch image by a printer based on image data of a color patch image; measuring a gradation of the outputted color patch image by a color measuring device so as to obtain a gradation measurement value; and correcting a gradation characteristic of the printer based on the gradation measurement value. The color patch image includes a patch-shaped image having a uniform gradation of a predetermined gradation representative value and gradation fluctuation of a predetermined color component added in the patch-shaped image, and the added gradation fluctuation is structured such that a total of gradation fluctuation measured in a measurement region by the color measuring device becomes a predetermined value. The gradation characteristic of the printer is corrected based on the gradation representative value, the predetermined value of the total of gradation fluctuation, and the gradation measurement value.

21 Claims, 24 Drawing Sheets

U.S. PATENT DOCUMENTS

2004/0160641 A1* 8/2004 Kohler et al. ............... 358/1.18
2006/0164700 A1   7/2006 Hayashi
2008/0158580 A1* 7/2008 Okamoto .................... 358/1.9
2009/0244564 A1* 10/2009 Kondo et al. ................ 358/1.9

OTHER PUBLICATIONS

Coudray "Understanding Midtone Dot Gain", retrieved from www.tshirtsuccess.com/public/121print.cfm, on Apr. 19, 2012, 2 pgs.

Kipphan "Handbook of Print Media, Chapter 3.2.2.3 Dot shape", Springer, Berlin Heidelberg, pp. 517-518 (2001).

Notification of the First Office Action received from the Patent Office of the People's Republic of China, for Application No. 200910262074.1, mailed Jul. 23, 2012, 10 pgs.

Translation of Notification of the First Office Action received from the Patent Office of the People's Republic of China, for Application No. 200910262074.1, mailed Jul. 23, 2012, 9 pgs.

* cited by examiner

PRINTER GRADATION CORRECTION METHOD AND COLOR PATCH IMAGE

This application is based on Japanese Patent Application No. 2008-332267 filed on Dec. 26, 2008, in Japanese Patent Office, the entire content of which is hereby incorporated by reference.

BACKGROUND OF THE INVENTION

The present invention relates to a method of correcting the gradation characteristic of a printer and a color patch image used for this correction.

In the case that an image is produced by a computer or an image is obtained by an optical read-out, in order to print out a printed matter corresponding to such an image with intended colors, correction of image signals is conducted in such a way that the gradation characteristic (the characteristic of output gradation values to input gradation values (image signal values)) of a printer is measured, gradation correction characteristics (for example, it is saved in the form of printer profile mentioned later and utilized) is produced based on the above measurement result, and image signals are corrected by the produced gradation correction characteristics.

Usually, measurement of the gradation characteristic of a printer is conducted by a process of printing a color patch of predetermined colors with a printer and a process of measuring the printed color patch by a color measuring device. It is desirable that the color patch is produced for all of colors capable of being expressed with image signals provided to the printer. However, there is a large number of colors capable of being expressed (combination of gradation values capable of being made by each color component of image signals). For example, in the case of a full color printer employing four color components of Y (Yellow), M (Magenta), C (cyan) and K (black), if it is assumed that each color ahs 256 gradations, there are combinations of gradation values more than 4 billion (4th power values of 256). For this reason, a color patches are produced for only a small portion of these combinations, and the gradation characteristics of intermediate color among the produced color patches are obtained by various kinds of interpolation operations.

FIG. 23 shows an example of the gradation characteristic of a printer obtained for one color component by the interpolation. Among the gradation values (256 kinds of gradation values in the case of 8 bits) capable of being taken by color components, several points are chosen as gradation representative values a1 to a6, and color patches corresponding to gradation representative values a1 to a6 are printed out and measured, whereby measurement values indicated with a circle mark in the drawing can be obtained. Subsequently, it is assumed that the characteristic changes continuously (or linearly), intermediate portions among the measurement values are obtained by interpolation, whereby the gradation characteristic A shown in the drawing can be obtained. Although various gradation representative values can be taken, the number of gradation representative values is set in the range of 5 to 9 for almost one color component. Actually, color patches are for all of the combinations of gradation representative values among color components, or for combinations selected further from these combinations.

FIG. 24 shows an example of a gradation correction characteristic B produced based on the gradation characteristic of a printer. The gradation correction characteristic B is a conversion characteristic of input gradation values (input image signal values) required to obtain predetermined output gradation values with the printer. At the time of printing a color chart image, image signals are obtained from input image signals by gradation conversion based on the gradation correction characteristic and the obtained image signals are outputted to a printer. Here, it is also desirable that an original gradation correction characteristic is defined for all of the number of gradations capable of being taken by image signal values, for example, for all of 256 gradations in the case of 8-bit images. However, if the gradation correction characteristics defied for all of the number of gradations are held as data, since the data becomes a huge amount of information, this is not practical. Then, gradation representative values are set up discretely, a LUT (Look Up Table) in which each gradation representative value is correlated with a gradation value after conversion is produced and saved, an intermediate vale between neighboring gradation representative values is interpolated under the assumption that the characteristic changes linearly (or continuously). Although the number of gradation representative values can be taken variously, the number of gradation representative values is set in the range of 15 to 33 for almost one color component, and combinations with regard to all of these color components are constituted.

Further, dispersion may be caused in color reproducibility depending on printing positions within a chart even the same patch. In order to cope with this problem, there is a method (refer Patent Document 1) in which color chart is made to include measurement-use patches for the measurement of printing characteristics and plural correction-use same color patches arranged at predetermined positions, the data of the color chart are printed, the printed color chart is measured, the degree of dispersion in the color measurement values of the measurement-use patches is calculated, the color measurement values of the measurement-use patches is corrected, and the profile of a printer is produced based on the corrected color measurement values of the measurement-use patches and the color values of the color chart data (refer to Patent Document 1: Japanese Patent Unexamined Publication No. 2001-320592).

Further, there is a profile producing method in which the number of outputted sheets of charts is reduced as compared with the case where many color patches are arranged, by measuring a gradation pattern for each of minute regions. For example, there is a method (refer Patent Document 2) in which gradation is formed such that lightness changes continuously, the gradation is subjected to color measurement for each minute region to obtain color measurement result data and a correspondence relationship between the color information of a reference pattern image and the obtained color measurement result data (refer to Patent Document 2: Japanese Patent Unexamined Publication No. 2005-318460).

Furthermore, there is an apparatus (refer Patent Document 3) which produces a chart in which optimal color patches corresponding to the classification of printers, such as an electro-photographic type and an ink-jet type and conducts color correction based on the chart (refer to Patent Documents 3: Japanese Patent Unexamined Publication No. 2008-72343).

A plurality of color patches corresponding to plural gradation representative values are printed with a printer, and then, the gradation characteristic of the printer is obtained by the interpolation of those measurement values. The resultant gradation characteristic of the printer is made based on the presupposition that the gradation characteristic changes continuously (or linearly) in intermediate portions among the gradation representative values. However, since most digital printers have realized a continuous gradation by pseudo multi gradation processing, there is a possibility that the discontinuity of gradation so called a tone jump occurs in limited gradation value depending on a technique related to an image forming condition.

FIG. 25 shows an example of the gradation characteristic of a printer in which a tone jump has occurred. An axis of abscissa represents the image signal values (input gradation values) given to the printer, and an axis of ordinate represents the gradation values (output gradation values) obtained by the actual measurement of a printed image. A tone jump J has occurred in a portion at which the gradation characteristics C indicated with a solid line becomes discontinuous. In the drawing, for comparison, a dotted line represents a gradation characteristic C' in which there is no tone jump.

For example, in the case that the pseudo multi gradation processing is being performed by a step of changing of the size of dot to be printed out, when the size of dot becomes large (or small) gradually, a tone jump is caused by the large change of gradation at the moment that neighboring dots come in contact with each other (or separate from each other). Successively, the influence of the tone jump appears as discontinuous in optical density (actual measurements, of course, for example, brightness, or reflectance ratio) of a printed image corresponding to image signal values.

With regard to the occurrence position of a tone jump, a tone jump may occur at various positions depending on a control mechanism of a printer. Further, even in the same printer, the occurrence positions (image signal values) of a tone jump changes in accordance with a process of correcting characteristic fluctuation of a printer.

If the gradation value of a color patch resides in the vicinity of the image signal value on which a tone jump occurs (in the example of FIG. 25, a tone jump occurs on the gradation representative value a3), a large change arises in the output gradation value of a color patch according to the condition of the printer at the time of the output of a patch, and the large change causes large influence onto the gradation characteristics of the printer obtained by the interpolation of the output gradation value.

FIG. 26 shows the example.

In the case that a tone jump occurs in the vicinity of the gradation representative value "a", if the characteristic of a printer changes slightly, a large change appears in the color measurement values measured across the tone jump. FIG. 26 shows the gradation characteristic F2 of a printer in the case that the gradation value at the time of the occurrence of a tone jump J is a gradation value La slightly lower than the gradation representative value "a" and the gradation characteristic F1 of the printer in the case that the gradation value at the time of the occurrence of a tone jump J is the gradation value Ua slightly higher than the gradation representative value "a". In this way, if the occurrence position of a tone jump J is changed across the gradation representative value "a", a large difference is caused in the gradation characteristics F1, F2 obtained by the interpolation of the measurement values related to gradation representative value "a". Further, the difference becomes very large as shown with a region E which is covered with gray and enclosed with lines connecting points of the gradation representative value "a" and another two gradation representative values (indicated with respective dashed lines at the right and left positions in the drawing) located before and after the value "a" on the gradation characteristics F1 and F2. This phenomenon is caused not only by a tone jump, but also by the case that there exists a gradation region in which a gradation characteristics is not discontinuous, but changes suddenly.

Patent Documents 1 mentioned above discloses a method of corresponding to variation in color reproducibility depending on printing positions, and Patent Documents 3 discloses a method of determining the arrangement patterns of color patches in accordance with the type and characteristic of an output device. However, both of these documents do not disclose a technique to reduce the influence of a tone jump and the like which appear in the gradation characteristic of a printer obtained by the interpolation of the measurement results of the color patches.

Further, as disclosed in Patent Documents 2, if a gradation pattern is measured in a number of measurement positions for each minute region, even if a tone jump and the like occur, errors by interpolation may be reduced. However, a measuring device with a high degree of accuracy and high resolution is needed for the measurement for such minute regions. Further, if there exist minute dirt, dust, blemish, and the like on printed gradation patterns, the measurement for such minute regions may receive the influence by them easily. Furthermore, in the case that a specific pattern appear in a gradation pattern by the pseudo multi gradation processing for a printer, the specific pattern causes large influence on the measurement result of minute region, and the exact measurement becomes difficult.

SUMMARY OF THE INVENTION

The present invention has been made to solve the above-mentioned problem, and an object of the present invention is to provide a printer gradation correcting method capable of conducting gradation correction of a printer by suppressing the influence of a tone jump to small and a color patch image capable of obtaining measurement values in which the influence of a tone jump occurring in the vicinity of the gradation representative value is equalized.

The above object can be attained by the following technique to which one aspect of the present invention is reflected.

A printer gradation correcting method, comprises the steps of:

outputting a color patch image by a printer based on image data of a color patch image;

measuring a gradation of the outputted color patch image by a color measuring device so as to obtain a gradation measurement value; and correcting a gradation characteristic of the printer based on the gradation measurement value;

wherein the color patch image includes a patch-shaped image having a uniform gradation of a predetermined gradation representative value and gradation fluctuation of a predetermined color component added in the patch-shaped image, and the added gradation fluctuation is structured such that a total of gradation fluctuation measured in a measurement region by the color measuring device becomes a predetermined value, and wherein the gradation characteristic of the printer is corrected based on the gradation representative value, the predetermined value of the total of gradation fluctuation, and the gradation measurement value.

DETAILED DESCRIPTION OF THE PREFERRED EMBODIMENT

Hereafter, embodiments of the present invention will be described based on drawings. However, the present invention is not limited to these embodiments.

Figure 1:
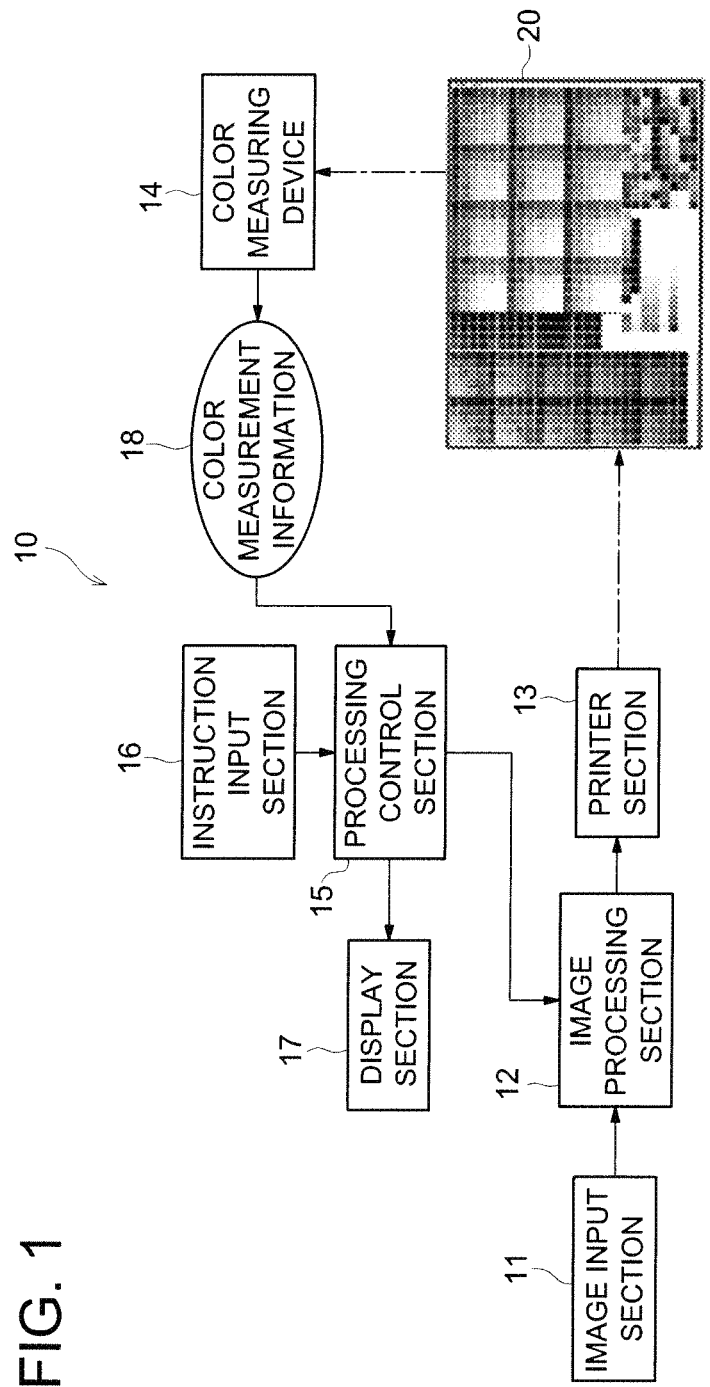
FIG. 1 is a block diagram showing the structure of a printing system which conducts gradation correction of a printer by employing the printer gradation correcting method according to the embodiment of the present invention.

FIG. 1 shows a structural example of a printing system 10 that conducts gradation correction of a printer by employing a printer gradation correcting method according to an embodiment of the present invention. A printing system 10 is constituted by an image input section 11 which inputs image data as an output target; an image processing section 12 which applies image processing, such as gradation correction, to image data; a printer section 13 which receives image data having been subjected to the image processing by the image processing section 12, prints an image corresponding to the image data onto a recording sheet, and outputs the recording sheet; a color measuring device 14 which conducts color measurement for a chart 20 which is outputted on the recording sheet from the printer section 13 based on chart image data for gradation correction and is used to test color reproducibility; a processing control section 15 which controls operations of the printing system 10 generally and conducts processes, such as a process of creating gradation correction information (gradation correction LUT (look-up table)) based on colorimetric information 18 obtained by the color measuring device 14; an instruction input section 16 which receives inputs of various instructions from a user; and a display section 17 which indicates various kinds of operation screens and processed images.

The image input section 11 achieves a function to input image data as a print target from networks, such as LAN (Local Area Network) and various kinds of memory media. The image input section 11 may be a scanner device which reads a document sheets optically and acquires image data. The image processing section 12 is constituted by various kinds of arithmetic circuits and logic circuits, a DSP (Digital Signal Processor), and the like. Also, the image processing section 12 may be constituted with a CPU (Central Processing Unit).

The processing control section 15 is constituted with CPU, ROM (Read Only Memory), RAM (Random Access Memory), and the like as principal parts. The CPU executes various kinds of processing in accordance with programs stored in the ROM so that a function as the processing control section 15 can be realized. The instruction input section 16 is constituted with a keyboard, a mouse, and the like. The display section 17 is constituted by display devices, such as a liquid crystal display, and their driver circuits, and indicates various kinds of operation screens, an image corresponding to image data of a print target, its corrected image, and the like in accordance with the control from the processing control section 15.

The printer section 13 is a printer that can print a full color image by combining coloring materials of plural color components. For example, it may be a color printer of an electro-photographic system that employs coloring materials of Y (Yellow), M (Magenta), C (cyan), and K (Black), an ink jet printer or the like. Further, it may be a printer that produces a color print with color components of multicolor (for example, six color components, eight color components, etc.).

The color measuring device 14 is a measuring device which measures color tone in a measurement region on an outputted print. For example, the measuring device has a photometry sensor, and the photometry sensor is provided with an opening portion at an inside of which a measurement region (aperture) is defined. Therefore, a color measurement is conducted while the opening portion of the photometry sensor is put on an object to be measured.

The "measurement region" in the present invention represents a region at where a color measurement is actually conducted by the color measuring section, such as the color measuring device 14 and the document scanner 18.

For example, the "measurement region" can be defined as follows.

In the case that a color measuring device has a predetermined aperture (an opening portion), the "measurement region" is a region within a range which can be measured by the aperture. In this case, the matter that which portion on a color patch becomes the measurement region is determined the fact that the aperture of the measuring device is put on which portion. Therefore, the measurement region is not located always at a fixed position on a color patch.

In the case that a color measurement is conducted by the following technique, the "measurement region" is a region in a patch extracted by the technique. That is, the color measurement is conducted with the technique in such a way that a scan image is acquired by conducting photometry separately on a chart with a scanner such as a flat bed type scanner, signals on a predetermined region are extracted and color measurement values are acquired by averaging the extracted signals with a predetermined algorithm (simple arithmetic average, medium-value acquisition, average in which data being abnormal values with high possibility, such the maximum value and the minimum value are eliminated, or the like). In the above technique, the predetermined region becoming as an extracted target may be different depending on a method of extracting a region. For example, in the case that a printed sheet on which a color patch is printed is placed at a designated position and is subjected to scanning, a preliminarily specified region on the scan image may be made to the predetermined region. In this case, the "specified region" is the measurement region, whereby the position on the color patch can be almost specified. However, some fluctuation may occur due to positional deviation at the time of the arrangement of the printed sheet and the scanning. Accordingly, in order to avoid such fluctuation, edges of a color patch or targets (crossed lines or specific patters for discrimination) to determine a region are detected as indexes for position adjustment from a scan image, the predetermined region (measurement region) to be extracted may be determined based on the indexes. In this case, the position of a color patch can be determined with sufficient accuracy. Therefore, the position of the measurement region on the color patch is also determined with sufficient accuracy for practical use.

The printing system 10 is structured to be able to conduct a gradation adjusting function to adjust gradation in addition to a function to conduct normal printing. Therefore, in the gradation function, the printing system 10 prints a chart 20 for gradation correction with the printer section 13, conduct color measurement for the chart 20 with the color measuring device 14, and produces gradation correction information (here, gradation correction LUT (Look Up Table)) based on the measurement results. The chart 20 is constituted such that plural kinds of color patches are arranged on a sheet. In this embodiment, the gradation correction LUT may be produced with another apparatus.

Figure 2:
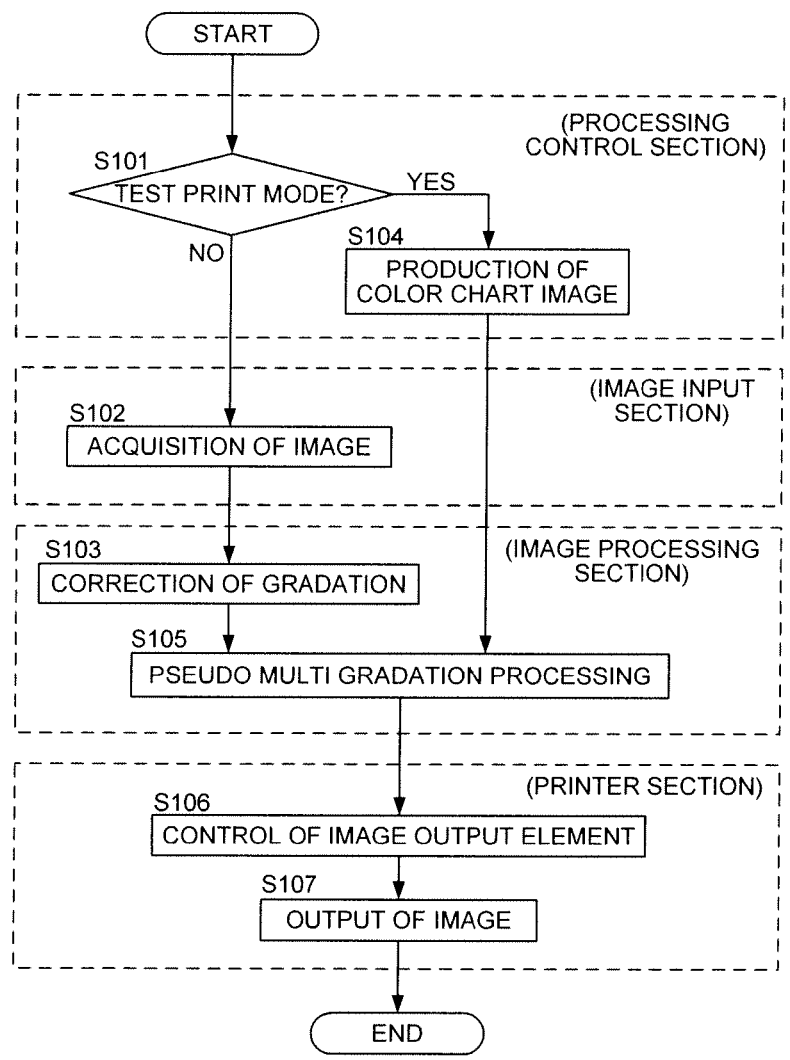
FIG. 2 is a flow chart showing a printing process which the printing system according to the embodiment of the present invention conducts.

FIG. 2 shows a flow of a printing process conducted by the printing system 10. The processing control section 15 judges whether an instructed print mode is a normal print mode or a test print mode (Step S101). As a result of the judgment, if the instructed print mode is a normal print (Step S101; No), the processing control section 15 obtains image data of a print target by controlling the image input section 11 to input them (step S102). Then, the processing control section 15 controls the image processing section 12 to conduct gradation correction (Step S103) and pseudo multi gradation processing (Step S105) for the image data, and outputs the processed image data to the printer section 13. Successively, the printer section 1 forms an image on a recording sheet based on the image data inputted from the image processing section 12, and outputs the recording sheet (Steps S106, S107).

As a result of the above judgment, in the case that the instructed print mode is a test print mode (Step S101; Yes), differently from a normal print, the processing control section 15 controls the image processing section 12 to produce image data (color chart image) for a predetermined test print mode by arithmetic processing (Step S104). Here, the image data of a color chart image may be prepared beforehand with another apparatus and stored in a storage section (no shown in any drawing), and at above step, the image data are read out from the storage section and used for the test print mode.

The image data of a color chart image are not subjected to processing, such as a process of "making a picture" to show the color chart image beautifully, gradation correction for providing the color chart image with desired output gradation and the like. However, the image data of a color chart image are subjected to only processes essential for a print (Step S105), and then the processed image data are printed (Steps S106, S107).

Herein, the image data of a color chart image may be subjected to the same gradation correction as that in Step S103. However, in this case, for example, it is necessary to conduct a correction process to eliminate the correction amount of gradation correction applied at Step S103 from the measurement values of the printed chart 20.

Figure 3:
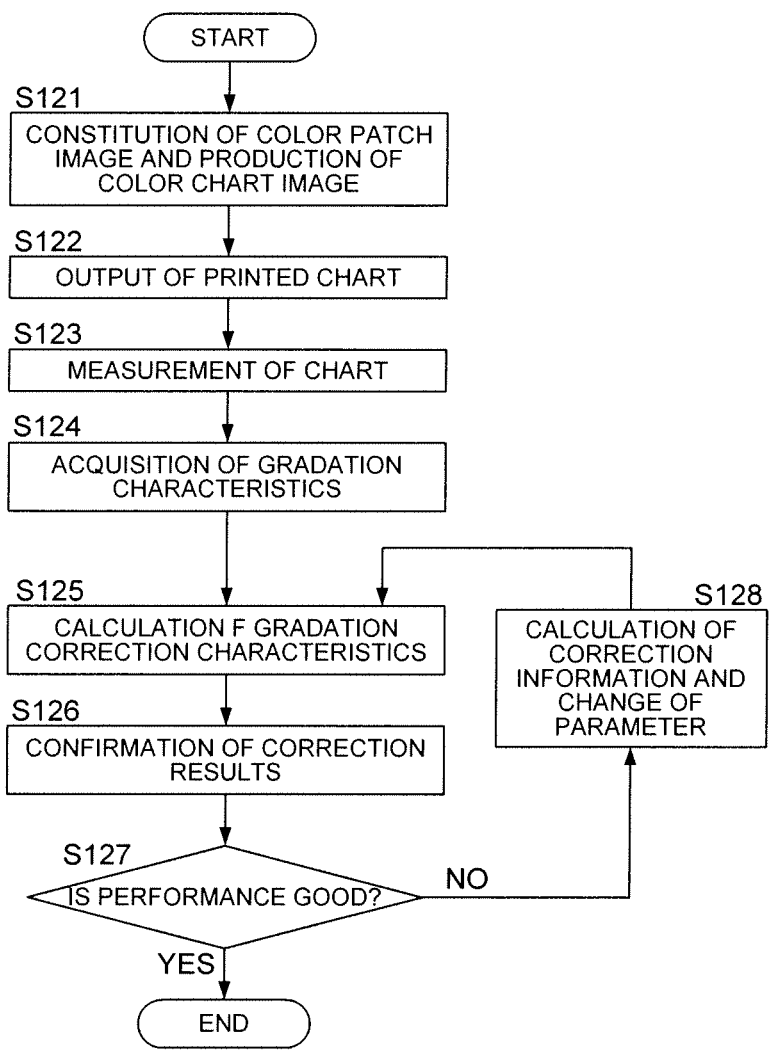
FIG. 3 is a flow chart showing a basic flow of the gradation adjustment which the printing system according to the embodiment of the present invention conducts.

FIG. 3 shows a flow of processing according to the gradation adjusting function.

First, a test print mode is conducted in the printing process shown in FIG. 2 so as to print and output a chart 20 corresponding to a color chart image (step S121, S122). The color chart image is constituted such that plural color patch images are arranged, each color patch image is made so as to add gradation fluctuation (hereafter, referred to as "fluctuation") of a predetermined gradation value of a predetermined color component onto a patch image having a predetermined gradation representative value, and the total of fluctuation (the total of amount of fluctuation) added within a measurement region measured by the color measuring device 14 becomes a predetermined value. The detail about fluctuation will be mentioned later. The color patch (output color patch image) is a printed part obtained by the printing of a color patch image, and plural color patches are arranged on the chart 20.

Next, the color measuring device 14 conducts color measurement for each color patch on this outputted chart 20 so as to obtain color measurement information 18 (Step S123), and a predetermined interpolation operation is conducted to interpolate between the measurement results of each color patch, whereby the gradation characteristic of a printer is acquired (Step S124). Successively, gradation correction information to print and output image signals with desired gradation is calculated based on this gradation characteristic and memorized (Step S125).

As the calculation method of the gradation correction information, there are various well-known methods, and can be selected suitably. Accordingly, a proper method can be selected among them. In many methods among them, fine adjustment can be conducted for the finishing state of the gradation correction information. Then, the result of gradation correction is checked based on the print result of evaluation images, such as an image which are outputted frequently, and an image which has a feature being easily grasped (Step S126). As a result of the check, in the case that the result is not good (Step S127; No), an operation to adjust the method calculating the gradation correction characteristic and set-put parameters is repeated until a satisfactory result is obtained (Step S128). If a good result is obtained (Step S127; Yes), the operations will be ended.

The gradation correction information is constituted, for example, as an ICC Profile and the like which ICC (International Color Consortium) advocates. In this case, a method of saving and using the gradation correction information in the form of a printer profile is put in practical use widely. In the printer profile, a look-up table (LUT) which stores characteristic information for every combination of gradation values in terms of color components of R (red), G (green), B (blue), and C (cyan), M (Magenta), Y (Yellow), K (black), or more multicolor is created as gradation correction information and is saved. Gradation correction in the normal print mode (Step S103 of FIG. 2) is carried out by the use of this look-up table (LUT).

Figure 4:
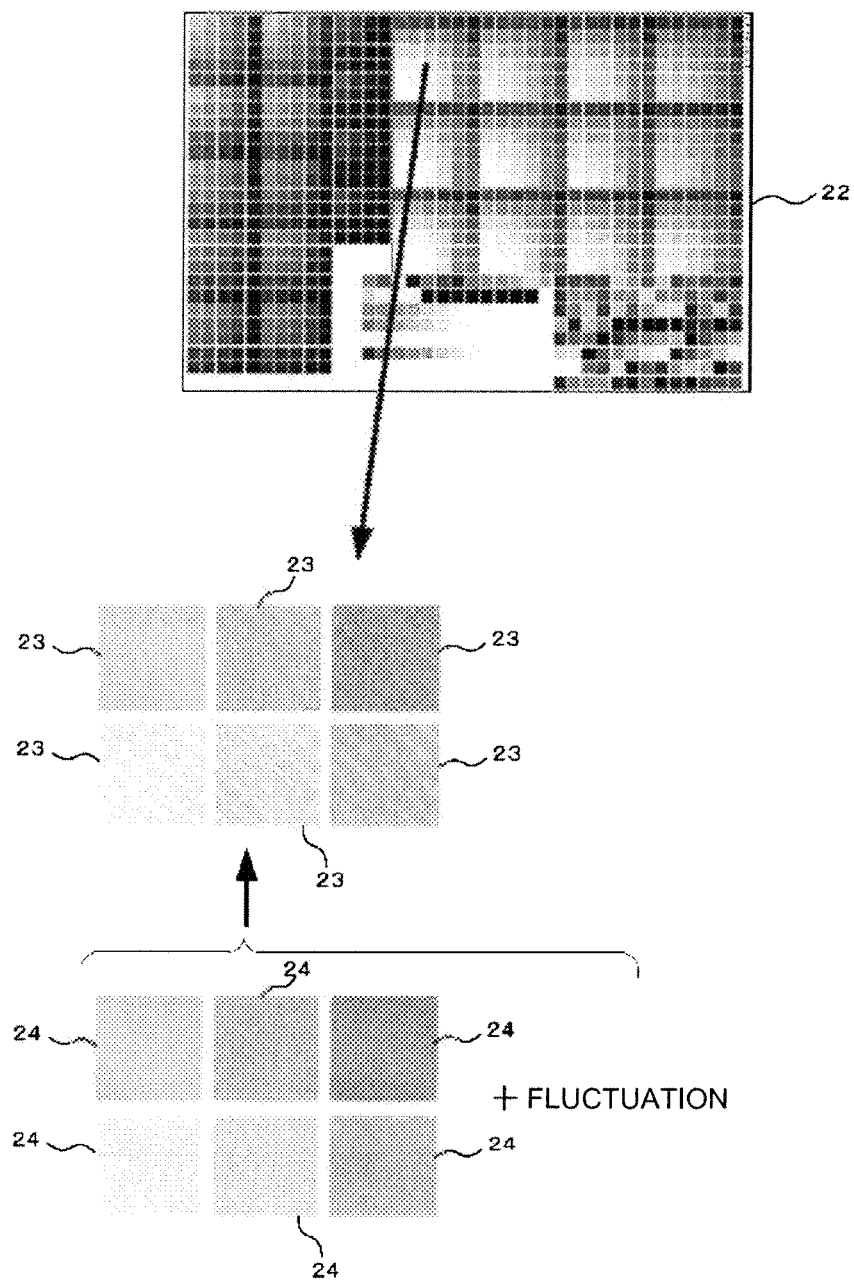
FIG. 4 is an explanatory drawing showing a desirable embodiment of a color chart image.

FIG. 4 is illustrated a desirable embodiment of the color chart image 22. The color chart image 22 is constituted such that two or more kinds of color patch images 23 are arranged suitably. For example, the color chart image 22 shown in FIG. 4 is an example in which color patches are arranged in accordance with ISO12642. However, the arrangement is not limited to this example. Color patch images 23 according to this embodiment is prepared such that fluctuation of a predetermined color component is added to patch images 24 which is an uniform gradation image having a predetermined gradation representative value, and the color patch images 23 is constituted such that the total of the amount of fluctuation added in the measurement region by a color measuring section such as a color measuring device 14 becomes a specified value. In the color patch image 23 shown in FIG. 4, "Fluctuation" in the shape of a stripe is provided to a gradation representative value of the patch image 24.

Figure 26:
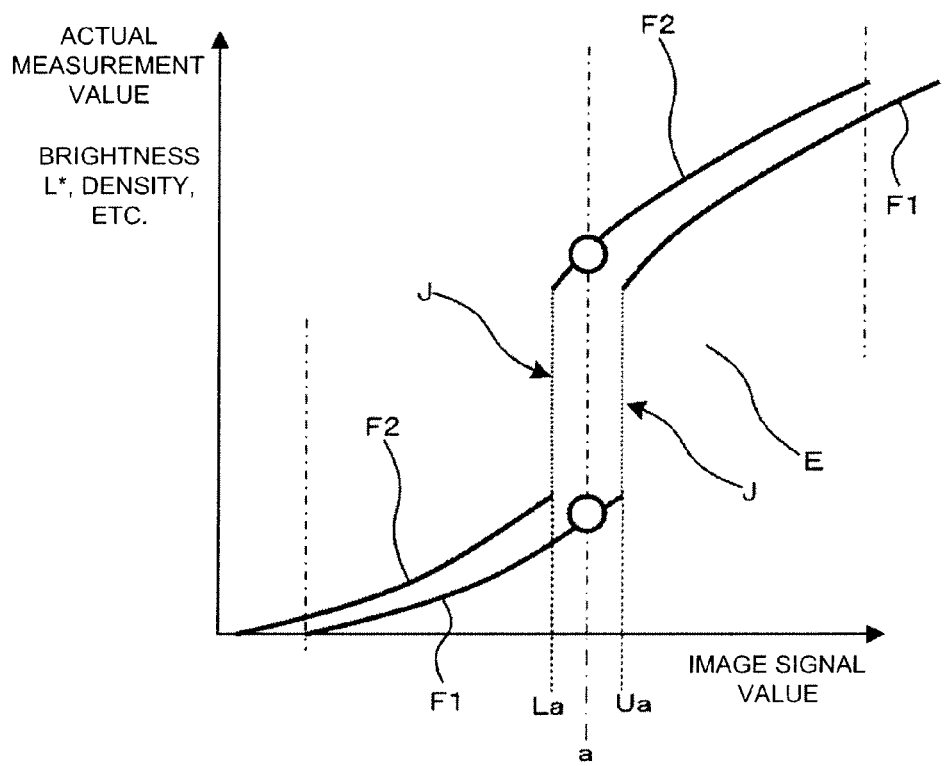
FIG. 26 is an explanatory drawing showing a range of fluctuation of the gradation characteristic of a printer caused by interpolation in the case that the occurrence position of a tone jump is changed across a gradation representative value.

In the conventional color patch, fluctuation is not added intentionally as exemplified in the patch image 24. In the case that the gradation characteristic of a printer is acquired by the color measurement for a printed image of a patch image 24 not provided with fluctuation, if a tone jump (discontinuity or sudden change in gradation) exists near the gradation representative value of the patch image 24 as explained with reference to FIG. 26, the gradation characteristic is changed sharply due to a slight change in the printer characteristic at the time of the output of a chart. As a result, the stable color reproducibility cannot be acquired.

Fluctuation is vibration in gradation value added in order to prevent this. That is, if fluctuation of a predetermined color component is added to a patch image 24 such that, for example, the total of the amount of fluctuation in a measuring range is 0 (zero) substantially, the printed gradation value of the color component will spread to a gradation range equivalent to the amplitude of fluctuation around the gradation representative value of the patch image 24 as the center. Therefore, a measurement value (color measurement value) of the color component becomes an equalized value of the gradation range corresponding to the amplitude of fluctuation. As a result, even if a tone jump occurs in the gradation range, it becomes possible to acquire a measurement value in which the influence of the tone jump is alleviated. Fluctuation may be given to the color component that constitutes a patch image, or fluctuation may be given to a color component other than the color component constituting a patch image.

Next, how to give fluctuation is explained.

Figure 5:
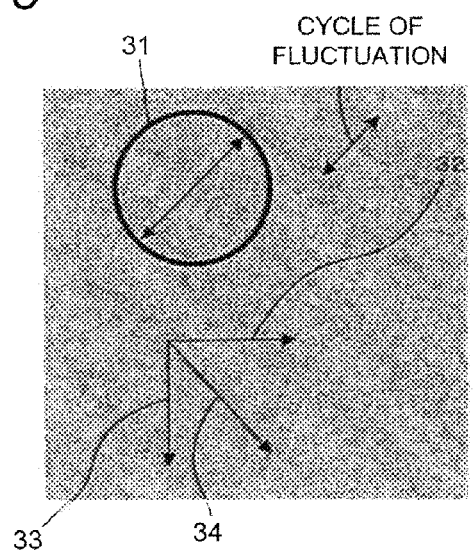
FIG. 5 is an explanatory drawing showing a technique to provide fluctuation.

As shown in FIG. 5, fluctuation is generated with a fixed cycle (wave length). In addition to a color component, there are a cycle, a direction, and amplitude in the attribute of fluctuation.

(1) With Regard to Cycle:

At the time of the measurement of a color patch, the average value of the gradation in connection with the color component of fluctuation in a measurement region changes depending on the measurement position in the color patch. For example, as a measurement region, a circular region 31 as shown in FIG. 5 is considered. This circular region corresponds to the case that image information obtained by the read-out of a chart with a scanner device is extracted by being clipped in the form of a circle, or the case a chart is measured by the use of a color measuring device with a circular opening ("aperture") which is usually used as the color measuring device 14.

Figure 6:
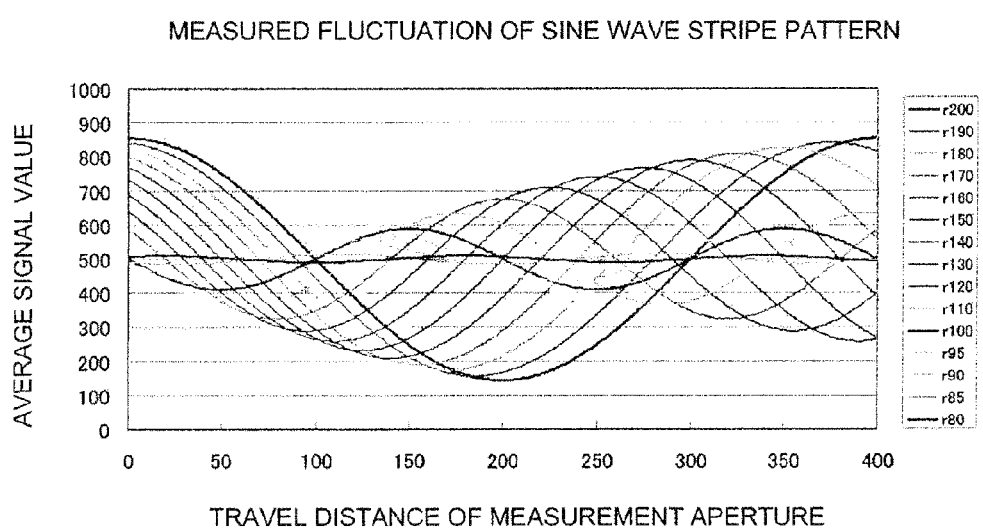
FIG. 6 is an illustration showing change of signal values of a fluctuation component in the case that the measuring point on the chart is moved successively by a circular measurement region.

FIG. 6 shows change of the measurement value (signal value) of a fluctuation component in the case that the measuring point on a chart with a circular measurement region is moved successively. In FIG. 6, the size of a measurement region (aperture) is made a fixed size and the relationship between the travel distance of a measuring point and the signal value of a fluctuation component is shown in terms of various kinds of fluctuation cycles. From FIG. 6, it is understood that the fluctuation component has a cyclical feature with a certain range of fluctuation. In the case that only the half cycle of fluctuation enters in a measurement region, change of the signal value due to the movement becomes large, on the other hand, if the periodical number of fluctuation entering the inside of a measurement region increases, change of the signal value due to the movement becomes small. However, if the periodical number of fluctuation is made too small, since the cycle of fluctuation and the cycle of a screen tone will come close to each other, it is not desirable.

Figure 7:
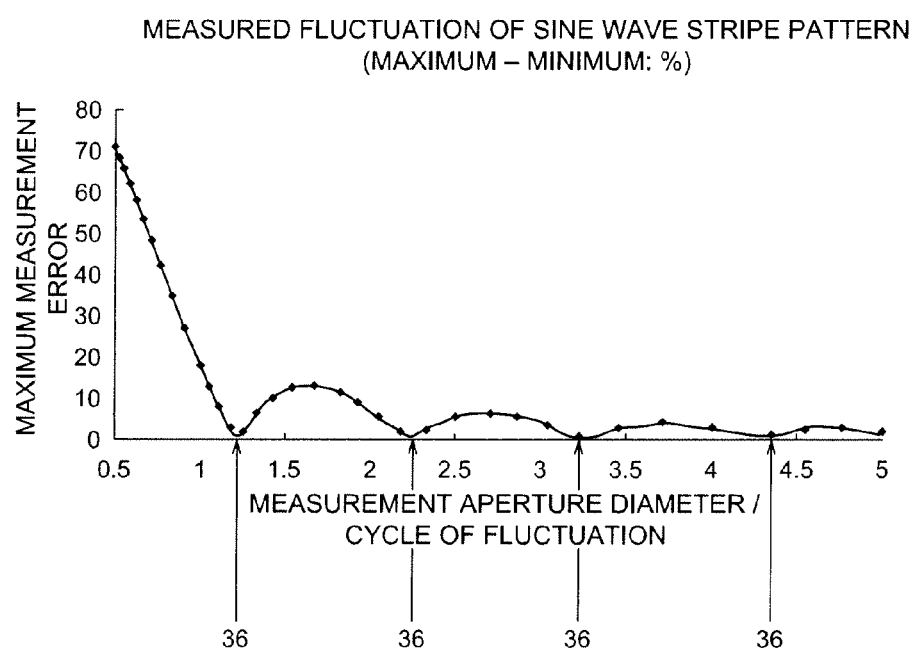
FIG. 7 is a diagrammatic chart showing how fluctuation changes with the different diameters of a circle serving as a measurement region on the assumption that the range of fluctuation of signal values shown in FIG. 6 is defined as "maximum-minimum".

In the case that a fluctuation range of signal value shown in FIG. 6 is defined as "maximum value−minimum value", FIG. 7 is a drawing showing how the fluctuation range changes with the diameters of a circle serving as a measurement region. The axis of ordinate represents "fluctuation range" and the axis of abscissa represents a value obtained by the division of the diameter of a circle serving as a measurement region with the cycle of fluctuation. It turns out generally that if the cycle is made shorter, the fluctuation range also becomes smaller. Further, as shown with each of arrowed marks 36 in FIG. 7, it turns out that the fluctuation range becomes small especially at the predetermined wave length corresponding to the diameter of a circle (diameter of an aperture) used as a measurement region. For example, in the case that fluctuation of about ±10 is given to image information of 8-bit gradation, it will swing, if the fluctuation range is settled to less than about 5% in FIG. 7, the swing quantity of the signal value of a fluctuation component is settled to 1 or less LSB, whereby sufficient accuracy can be acquired.

Here, a cycle is set up such that the total of the amount of fluctuation may become the same even if any part of a color patch is measured with a measurement region shaped in a predetermined shape. That is, a cycle of fluctuation is determined such that the mountain and valley of a strip of fluctuation enter a measurement region with the same ratio regardless of a measuring position. For example, in the case that a measuring region is a circular aperture, if the cycle of fluctuation is made (n+0.2) times of ((diameter of aperture of measuring device)/(fluctuation cycle)), (however, n is one or more integers), that is, if the cycle of fluctuation is made the cycle shown by each of arrowed marks 36 in FIG. 7, even if a measuring position is not determined correctly, components of each gradation fluctuation is uniformly distributed in the measurement region (aperture) of a measuring device, whereby it becomes possible to conduct measurement easily with high accuracy.

Similarly, in the case that a measurement region is a rectangle aperture, if the direction of fluctuation stripes is made perpendicular to the direction of one side of the rectangle aperture and the cycle of fluctuation is made "n" times of ((length of one side of a rectangle aperture being a measurement region)/(fluctuation cycle)), (however, n is one or more integers), even if a measuring position is not determined correctly, components of each gradation fluctuation is uniformly distributed in the measurement region (aperture) of a measuring device, whereby it becomes possible to conduct measurement easily with high accuracy. In FIG. 5, the diameter of a circular measurement region (aperture) 31 is set to 2.2 times of a cycle.

(2) With Regard to the Direction of Fluctuation:

It is desirable that stripes produced by fluctuation are set up in accordance with the device consideration of a printer. For example, an angle is given to the stripes so that the stripes are not parallel to or not perpendicular to the direction of a screen. That is, mountain and valley of the stripes of fluctuation are made not to synchronize with the characteristic of a screen. With this, various combinations are made in the relationship between the stripe pattern of fluctuation and a screen pattern, whereby smoother measurement results can be obtained. Further, an interference condition of the stripe pattern of fluctuation with a printer screen becomes difficult to be observed visually, whereby there is an effect capable of reducing an opportunity that unnecessary anxiety is caused on a printer user who does not grasp the technical implication of operations. In FIG. 5, the direction 34 of the stripes of fluctuation is set up to become 45 degrees to two screen directions 32 and 33 which intersect perpendicularly to each other, respectively.

With regard to the printer characteristics which affect fluctuation, "main scanning, sub scanning directions" and "conveying direction of a sheet" are listed as important characteristics besides the direction of screen treatment. For example, as with an ink jet printer, in the case that a print head (functional section for jetting ink and adhering the ink onto a sheet) being relatively small as compared with a sheet is moved perpendicularly to a sheet conveying direction (this direction is called generally the sub scanning direction so that an image is formed, there may be a case that fine image structures appear in the main scanning, sub scanning directions (as with a screen structure) in association with print control. It is recommendable that the direction of fluctuation is defined in the direction in which interference does not generate easily in connection with at least clearest one among these image structures. That is, it is desirable to avoid a parallel arrangement and to be arranged with a proper angle. The main scanning, sub scanning directions exist in a scanning exposure by the use of a laser and a polygon mirror or a line exposure by the use of a line print head, and in the both cases, usually, the sub scanning is conducted by the conveyance of a sheet.

Figure 8:
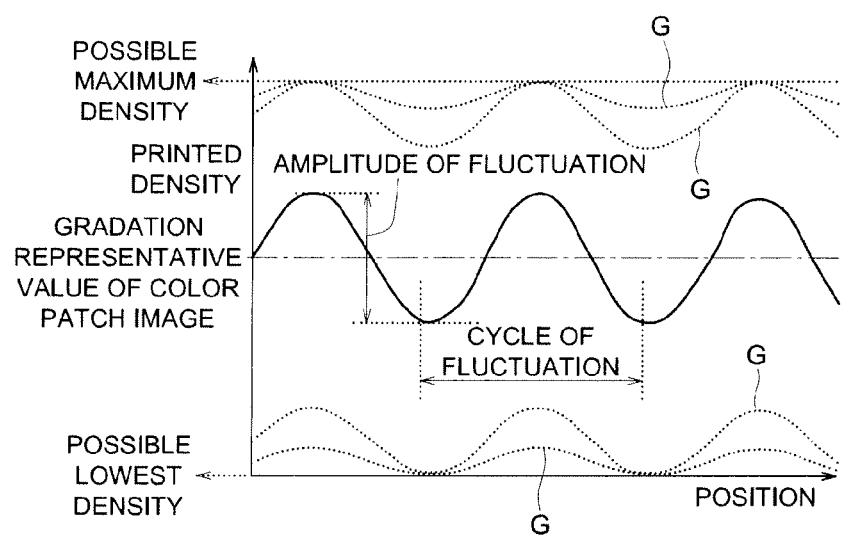
FIG. 8 is an explanatory drawing showing the relationship between the gradation range capable of being taken by the signal values of a fluctuation component and the amplitude of fluctuation.

(3) With Regard to the Amplitude of Fluctuation:

FIG. 8 shows the relationship between the gradation range which the signal values of an image can take and the amplitude of fluctuation. It is desirable that the amplitude of fluctuation provides diversity capable of becoming a representative of a gradation region covered by one measurement value. For example, if the amplitude of fluctuation is set to an amplitude of about one third (⅓) times of grid spacing of a gradation correction LUT to be obtained or one third times of a gradation difference between neighboring color patch images on a color chart image, whereby the characteristic values including neighboring characteristics in a good manner can be acquired. Also, it is desirable that the amplitude of fluctuation is set to a width which receives hardly influences of the nonlinearity of continuous gradation which naturally exists as a characteristic of a printer. In the case that the amplitude of fluctuation is set to the same width as that of grid spacing of the gradation correction LUT, it is possible to acquire characteristic values with the consideration about the almost entire region of a gradation region to which the representative gradation value mainly works, whereby the amplitude can be enlarged more and the representative value covering the wider range can be acquired.

In the case that too much large amplitude is set up, the amplitude will separate from an object gradation greatly and data having less relationship with gradation will be referred to. Therefore, if the amplitude is set to about two times or less, or one time, as more precise expression, of grid spacing of a gradation correction LUT, it is possible to acquire characteristic value to which characteristics neighboring the gradation representative value are sufficiently considered.

Further, the amplitude of fluctuation may be adjusted based on chromaticity information (approximate calculation, estimated values of $L^*a^*b^*$ values) of an object gradation. For example, in a green high saturation hue in a $L^*a^*b^*$ color coordinate system or in a region where change of visual perception is small to change of signal values due to a tone change without accompanying a big luminance change, the tolerance to a possible measurement error caused by "fluctuation" of a signal value can be set up to be large, whereby a more large "fluctuation" can be provided. With this, it is possible to acquire gradation value in this region stably, and more stable correction effect can be acquired with less occurrence of side effect.

In the case that a gradation representative value is close to the possible minimum density or the possible maximum density (that is, close to the minimum gradation value or the maximum gradation value), the possible amplitude causes some restrictions from itself. In that case, the amplitude may be made small suitably like a dotted line G in FIG. 8.

Further, in FIG. 8, a smooth curve (for example, the form of a sine wave) is illustrated as how to give fluctuation. However, fluctuation is not limited to only this curve, and it may be adjusted suitably. For example, in the case that the frequency of appearance of fluctuation signals is made constant, fluctuation becomes the form of a triangular wave or a saw-tooth wave; in the case of not employing a middle fluctuation condition, fluctuation becomes the form of a rectangular wave, and in the case that a middle value is limited to several levels, fluctuation is defined with the form of a staircase-shaped wave. As a general application, a sine wave, a triangular wave, a saw-tooth wave and a modified wave, which do not have a big variation in the frequency of appearance within fluctuation distribution, may be employed.

Figure 9:
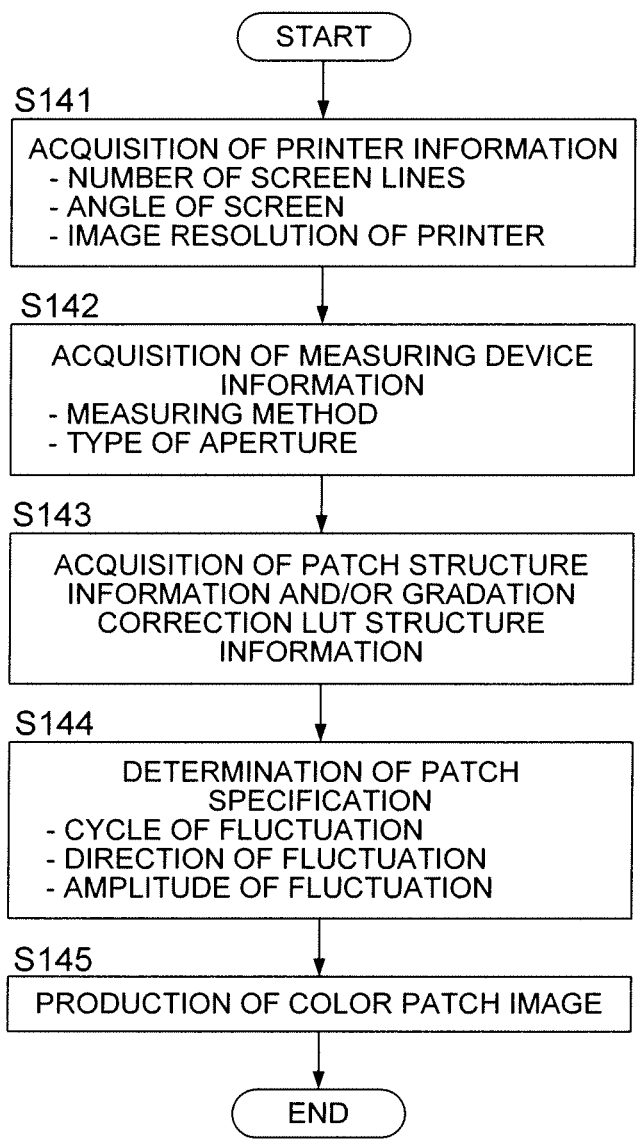
FIG. 9 is a flow chart showing a producing process of a color patch image.

FIG. 9 shows a production flow of a color patch image. As mentioned above, a pattern of fluctuation included in an optimal color patch image is determined by some parameters, such as a measurement region (the size and form of a measurement region, and the size and form of an aperture) of a measuring device, the resolution of a printer, and a direction of a screen. Then, necessary parameters in connection with a printer or a measuring device are obtained (Step S141, S142), further, information such as grid spacing of a gradation correction LUT and the like are obtained (Step S143), a color patch image (especially, the cycle, direction, amplitude, etc. of fluctuation) adapted to these is determined (Step S144), and a color chart image in which these color patch images are arranged is produced (Step S145).

Figure 10:
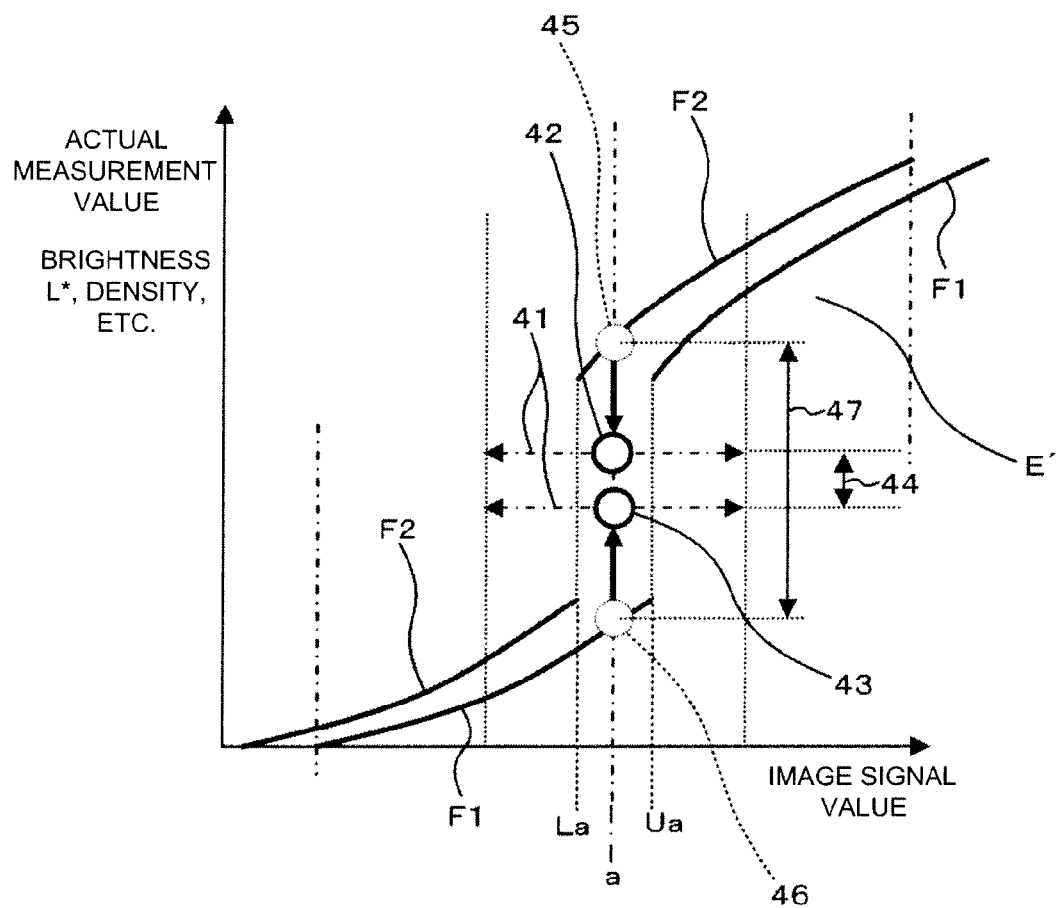
FIG. 10 is an explanatory drawing showing the effect of a color patch image to which the fluctuation according to the present invention is added.

FIG. 10 is a drawing showing the effect of the present invention. The drawing shows results that the characteristics F1 and F2 of a printer are measured by the use of a patch provided with fluctuation. In the case that fluctuation has been given, a measurement value for one gradation representative value "a" becomes a value calculated based on the distribution of gradation in a gradation range 41 (range indicated with a transverse arrowed mark of one dot chain line in the drawing) where fluctuation vibrates. In other words, the measurement value becomes a value which the gradation distribution in the gradation range 41 of fluctuation is averaged (equalized). For this reason, the influence of a tone jump generated in the vicinity of the gradation representative value "a" is alleviated preferably.

That is, even if the gradation value changes at the occurrence position of a tone jump due to slight fluctuation of the characteristic of a printer such that the change of the gradation value steps over the gradation representative value "a", a difference (gradation gap 44) between the measurement values 42 and 43 of print gradation becomes small and is stable as compared with the tone jump (a gradation gap 47) between the gradation value 46 and the gradation value 45. Therefore, in the case that a change of the gradation value at the occurrence position of a tone jump steps over the gradation representative value "a", the amount of change (gray region E') in the gradation characteristics of a printer obtained by the gradation representative value "a" becomes also small significantly as compared with the region E in FIG. 26. Therefore, it turns out that the actual gradation fluctuation of a printer is indicated very well. In connection with the gradation correction characteristics produced based on this measurement result, it is possible to acquire a proper one corresponding to actual change of the gradation characteristics of a printer. In FIG. 10, the measurement values 45 and 46 and the gradation gap 47 at the time of measuring by the use of the conventional color patch are shown for the purpose of comparison.

Next, an explanation will be made about the case that fluctuation included in a color patch image is made different between a gradation region where a tone jump occurs and a gradation region where a tone jump does not occur.

Figure 11:
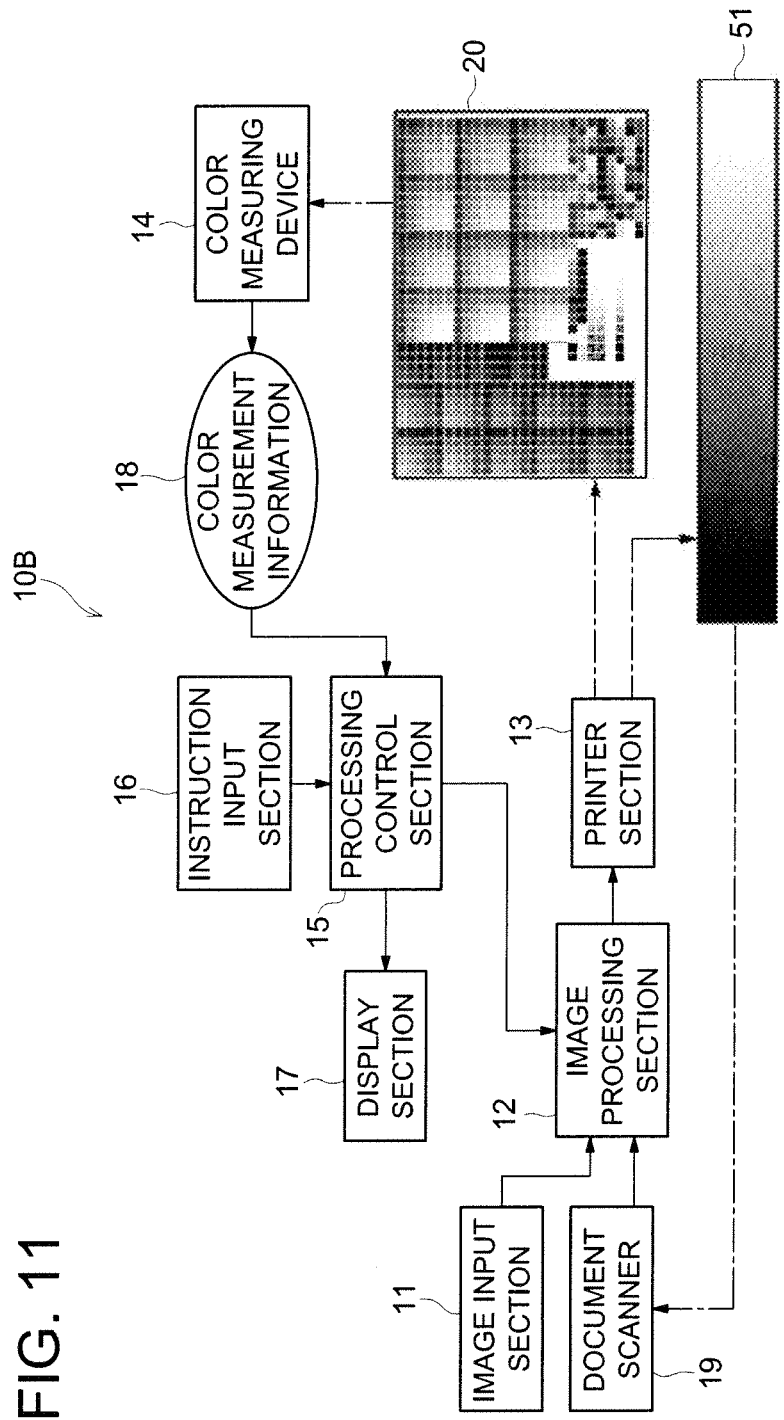
FIG. 11 is a block diagram showing a structural example of the printing system provided with a function to investigate a gradation region in which a tone jump is predicted.

FIG. 11 shows a structural example of a printing system 10B equipped with a function to investigate a gradation region where the occurrence of a tone jump is predicted. The printing system 10B has a function to investigate a gradation region where the occurrence of a tone jump is predicted, in addition to a function that the printing system 10 shown in FIG. 1 has.

The printing system 10B is further equipped with a reflection type document scanner 19 which can be used for a copy and the like against the structure of the printing system 10 shown in FIG. 1. The other structures are the same as that in the printing system 10. The printing system 10B prints and outputs a gradation chart (test chart) 51 based on image data (a gradation chart image, a test image) for gradation charts, reads this gradation chart 51 with a document scanner 19, and specifies a gradation region where a tone jump is predicted, based on the read-out result.

In a gradation chart image, a gradation pattern is produced such that one variable (gradation value of a color component) was successively changed in accordance with the coordinates of the transverse direction in a chart (usually, it becomes an image called a wedge chart or a wedge chart), and fluctuation of predetermined signal values (gradation values of a predetermined color component) is generated in the gradation pattern such that the added values in a predetermined measurement region becomes a specified value. Therefore, the gradation chart image is an image in which fluctuation is generated in gradation pattern. The predetermined value is preferably made to 0 (zero) substantially. The component to generate fluctuation may be another variable from variables constituting the gradation pattern or may be variables constituting the gradation pattern.

Figure 12:
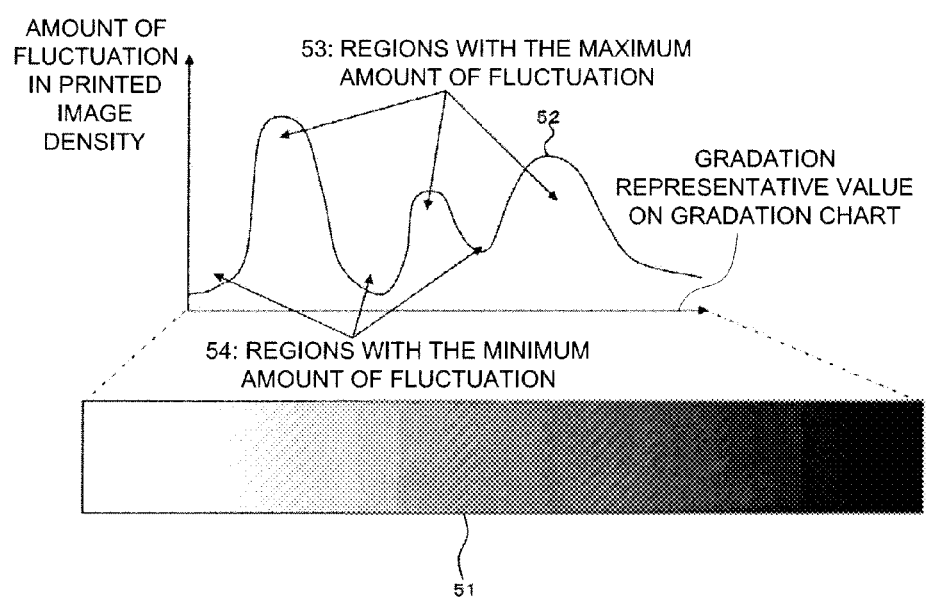
FIG. 12 is a drawing for explaining a function of a gradation chart 51.

FIG. 12 is a drawing for explaining the function of a gradation chart 51. Stripes of fluctuation become pale or disappear at a location where change of the gradation value of an outputted image (on a gradation chart 51) is small for a change of a signal values (gradation value of a fluctuation component contained in a gradation chart image). On the other hand, stripes of fluctuation become deep at the location where change of the gradation value of an outputted image is large for a change of a signal value. In a graphic chart 52 in which the amount of fluctuation on the printed gradation chart 51 is indicated as an axis of ordinate, the relationship between the amount of fluctuation and the gradation representative value on a gradation pattern is plotted. On this graphic chart 52, the occurrence of a tone jump will be predicted in a gradation region where the amount of fluctuation is large. In the drawing, a region 53 is a gradation region where an amount of fluctuation is large, and a region 54 is a gradation region where an amount of fluctuation is small.

A color patch image provided with fluctuation having large amplitude is applied to a gradation region where the amount of fluctuation is large, whereby, even in the location where the characteristics of a printer becomes disorder, it is possible to equalize the disorder and conduct a proper measurement. Similarly, a color patch image provided with fluctuation having small amplitude or a color patch image not provided with fluctuation is applied to a gradation region where the amount of fluctuation is 0 (zero) or small, whereby fluctuation more than needed is not applied, and side effects can be lessened.

Figure 13:
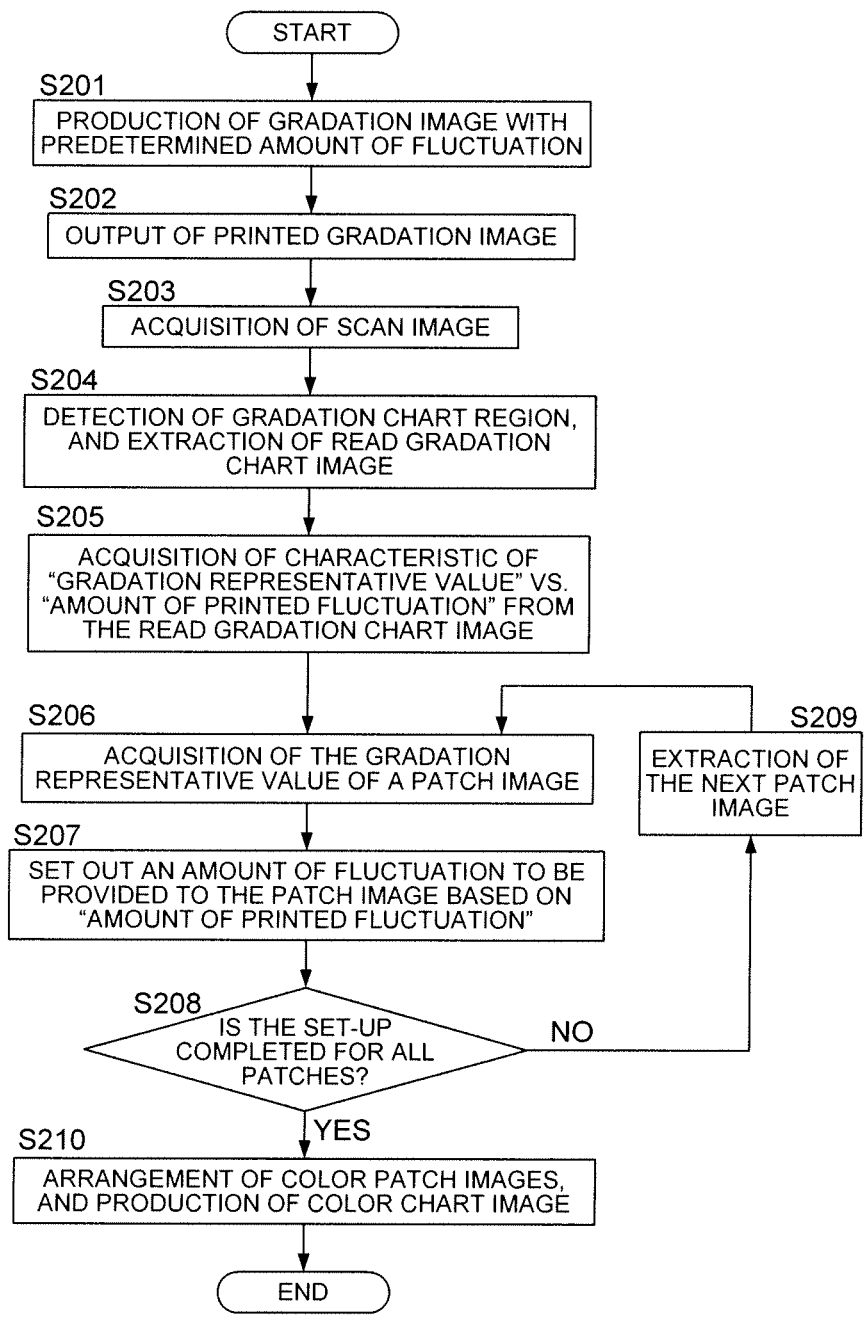
FIG. 13 is a flow chart showing a process of determining the amplitude of fluctuation to be given to a color patch image based on the measurement result of a gradation chart.

FIG. 13 shows a flow of a process to determine the amplitude of fluctuation to be included in a color patch image for each color patch image based on the measurement result of a gradation chart 51. First, a gradation chart image is formed, or a gradation chart image having been prepared beforehand is read (Step S201). The, based on this gradation chart image, a gradation chart 51 is printed and outputted by the printer section 13 (Step S202), and the outputted gradation chart 51 is scanned and read by the document scanner 19, whereby a scan image is obtained (Step S203).

Since the obtained scan image includes superfluous images, such as a margin of a print, a region corresponding to the gradation chart 51 is detected from the scan image, and an image in the detected region is cut off and extracted (Step S204). From the extracted image (referred to as a read gradation chart image), a gradation representative value (in the gradation chart 51 shown in FIG. 12, position information in the lateral direction corresponds to the gradation representative value) and an amount of fluctuation (an amount of print fluctuation) appeared in the gradation chart 51 at the position corresponding to the gradation representative value are obtained, whereby the characteristic between "gradation representative value" and "amount of print fluctuation" (graphic chart 52 shown in FIG. 12) is obtained (Step S205).

From the characteristic between "gradation representative value" and "amount of print fluctuation", the "amount of print fluctuation" corresponding to a gradation representative value of a patch image can be obtained, so that the amplitude (the amount of fluctuation) of fluctuation to be added to each patch image is determined in accordance with this way (Step S206, S207).

When the operation to determine the amplitude of fluctuation for all the patch images has been completed (Step S208; Yes), color patch images are produced in such a way that each patch image is added with an amount of fluctuation corresponding to the each patch image, and a color chart image in which those color patch images are arranged is produced (Step S210).

In the above process, in gradation regions where the occurrence of a tone jump is predicted, the sufficient amplitude of fluctuation is taken such that the influence of the tone jump is equalized effectively. In the other regions, weight is placed on the characteristic of gradation representative values, whereby the acquisition of the gradation characteristic corresponding to the condition of a printer can be surely conducted.

Next, a modified example of the pattern of fluctuation will be explained.

In the case that a reflection type document scanner 19 is used so as to extract information of predetermined color patches correctly from the scan image of a printed chart 20, or in the case that an aperture of a measuring device can be arranged at a desired measuring position, there is no need to consider errors in measuring position. For this reason, since the degree of freedom in the selection of patterns of fluctuation increases, various patterns of fluctuation can be selected other than cyclic stripe patterns.

Figure 14:
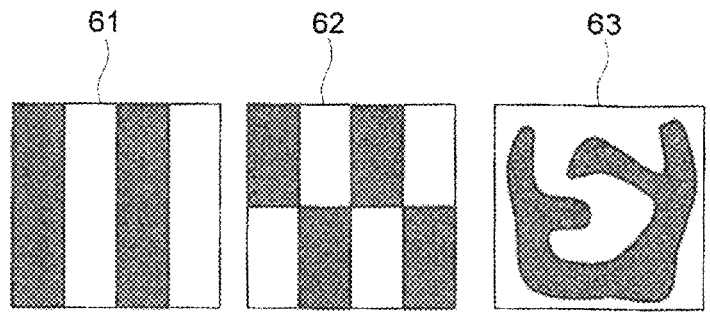
FIG. 14 is an explanatory drawing showing patterns of various kinds of fluctuation.

FIG. 14 is a drawing showing various kinds of patterns of fluctuation. In FIG. 14, for the purpose of convenience in explanation, a part where the gradation value of fluctuation becomes "+" than an average value in its region is represented with "white" and a part where the gradation value of fluctuation becomes "−" is represented with "gray". However, it is assumed that actually, the gradation of fluctuation is changing continuously. A pattern 61 represents a stripe-shaped fluctuation pattern in which the amplitude changes in the shape of a sine wave as explained hitherto. In a pattern 62, the phase of a striped is shifted between in the upper half and in the lower half. In the example in FIG. 14, the phase is shifted by 180 degrees. A pattern 63 is a fluctuation pattern in the form of arbitrary shape.

In the case that there is no need to take an error of a measuring position into consideration (for example, in the case that the rectangular region of each of the patterns 61, 62, and 63 shown in FIG. 14 can be extracted as a measurement region correctly), If a design is conducted such that the average information value of a measurement region becomes a predetermined gradation representative value, that is, the total of the amount of fluctuation in a measurement region becomes 0, patterns like the patterns 62 and 63 other than stripes may be also used. With regard to a measuring position, for example, if specific marks (crossed lines or specific patterns for discrimination) provided in the chart 20 or edge portions of a color patch are detected as an index, a measuring position is specified as a relative position on the basis of this index.

Figure 15:
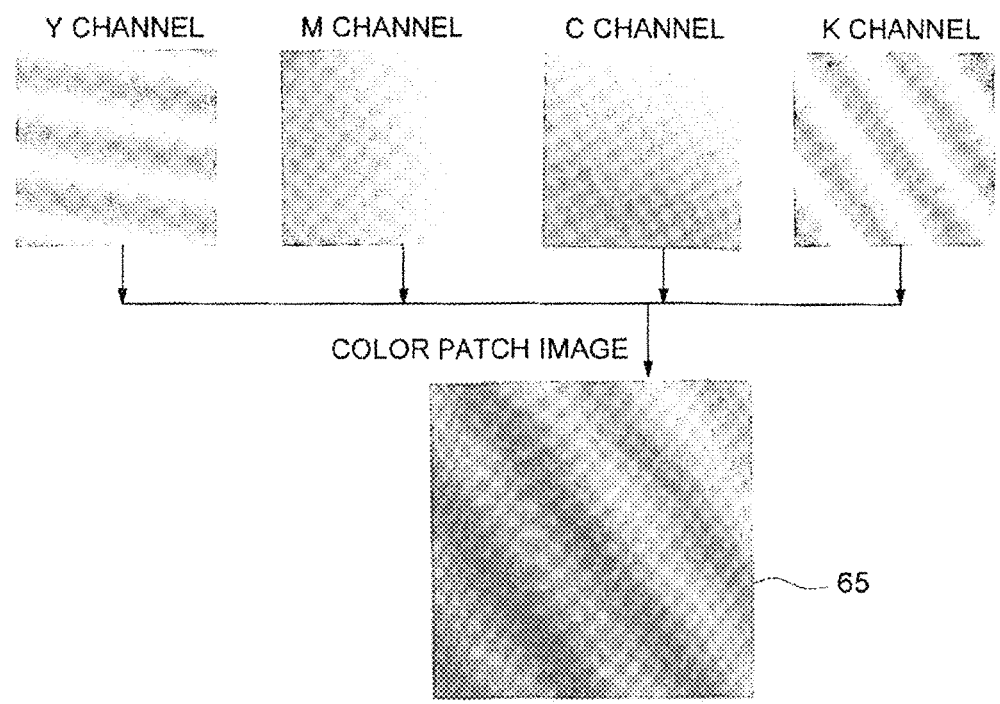
FIG. 15 is an explanatory drawing for exemplifying the pattern of the fluctuation in the case that fluctuation is given to plural color components.

FIG. 15 is a drawing showing another pattern of fluctuation. In this example, fluctuation is provided to plural variables. For example, in the case that a color image is constituted with four color components of C M Y K colors which are used widely in a color copy and a color printing, it may be possible to provide two variables (in FIG. 15, M channel and C channel) with a long cycle fluctuation in which the maximum and minimum of a fluctuation appear one time respectively within a measurement region and to provide remaining two variables (in FIG. 15, Y channel and K channel) with a short cycle fluctuation sufficiently shorter (for example, one several (⅓ to ⅙)) than the above long cycle fluctuation. Further, in the color patch image 65 shown in FIG. 15, the direction of stripe of fluctuation in M and C is made different from that in Y and K. With this, moire caused by the interaction of the fluctuations of four variables can be reduced, and data in 4 dimensional space can be read more evenly, whereby desirable representative values can be obtained.

If the total (or, average value) of the amount of fluctuation within a measurement region is a value near 0 (substantially 0) with sufficient accuracy, the total may be deemed as 0. Further, even if the total (average value) is not 0, if the total is a certain "value capable being grasped" (predetermined value), it may be permissible to consider in such a way that the gradation representative value of the color patch image is deviated by the "value capable being grasped".

The gradation correction of a printer is conducted based on the gradation representative value of a color patch image, a predetermined value which shows the total of the amount of fluctuation in a measurement region, and measurement values obtained the actual measurement of a color patch. That is, if the total of the amount of fluctuation is a predetermined value, in the case that the value of (a gradation representative value of a patch image+a predetermined value) is made an input gradation value, an output gradation value is assumed as an actual measurement value and the gradation characteristics of a printer is obtained based on this assumption, and then a gradation correction characteristic for color components of fluctuation may be obtained from this gradation characteristic. If the total of the amount of fluctuation is 0 (zero), in the case that a gradation representative value of a patch image is made an input gradation value, an output gradation value is assumed as an actual measurement value and the gradation characteristics of a printer is obtained based on this assumption, and then a gradation correction characteristic for color components of fluctuation may be obtained from this gradation characteristic.

Here, "substantially 0" does not mean to define strictly 0 as a numerical value. For example, in the case that the signal processing is based on 8-bit image information, if the total of the amount of "fluctuation" is made 2 LSB or less, practically 1 LSB or less, since the resultant value has sufficient numerical precision, the total of the amount of "fluctuation" may be considered as 0 substantially. Namely, the total being small sufficiently for the required measurement accuracy may be permissible. From the above matters, even in the case that an average does not become 0, if an average of fluctuation is always substantially settled within a predetermined value (for example, within 10±1), the gradation representative value of the color patch may be considered to shift by the predetermined value, whereby the color patch can be processed similarly.

Next, the application of fluctuation will be explained.

Figure 16:
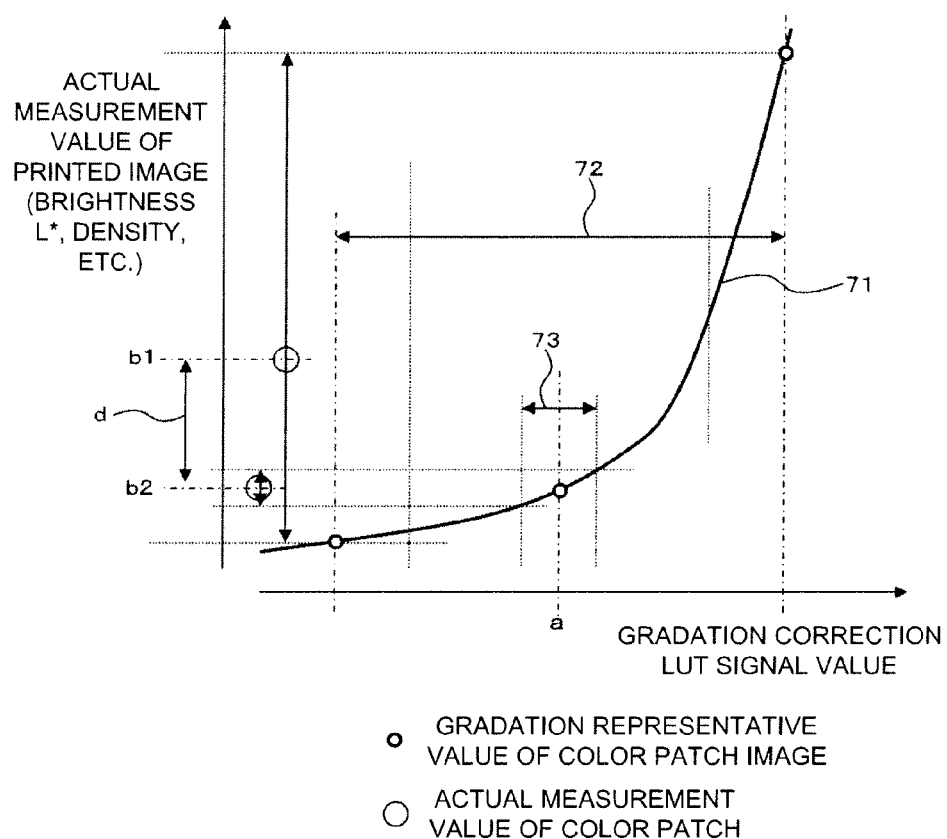
FIG. 16 is an explanatory drawing for exemplifying the measurement results of two kinds of patches provide with different fluctuations that have the same average gradation value and respective different amplitudes.

As shown in FIG. 16, in the case of printing and outputting two color patch images different in an amount (amplitude) of fluctuation in a gradation region having a large nonlinear gradation characteristic 71, even if two color patch images have the same gradation representative value in the original image information (color patch image), an average measurement value of each of the printed color patches corresponding to the two color patch images become different from each other. FIG. 16 shows the following measurement results. A large fluctuation patch was printed based on image data of large fluctuation patch image in which fluctuation having a large amplitude 72 was added into a predetermined patch image, and a small fluctuation patch was printed based on image data of small fluctuation patch image in which fluctuation having a small amplitude 72 and the same average gradation value "a" in a measurement region as that in the large fluctuation patch image was added into a predetermined patch image. Then, the measurement was conducted for the obtained large fluctuation patch and the small fluctuation patch.

Since the large fluctuation patch image and the small fluctuation patch image have the same average gradation value "a" of fluctuation, if the gradation characteristic of a printer is a linear characteristic, a difference will not be caused between the actual measurements b1 and b2 of both the printed patches. However, if a difference "d" becomes large between the actual measurement b1 of the large fluctuation patch and the actual measurement b2 of the small fluctuation patch, it turns out that the gradation characteristic of a printer changes suddenly on such a gradation region. Therefore, in the gradation region where difference "d" becomes larger than a predetermined value, it is desirable to increase the number of gradation representative values (kinds of color patches).

At this time, a process to print additional patches may be conducted automatically. However, it is desirable to display a message to ask an operator to input an instruction.

Figure 17:
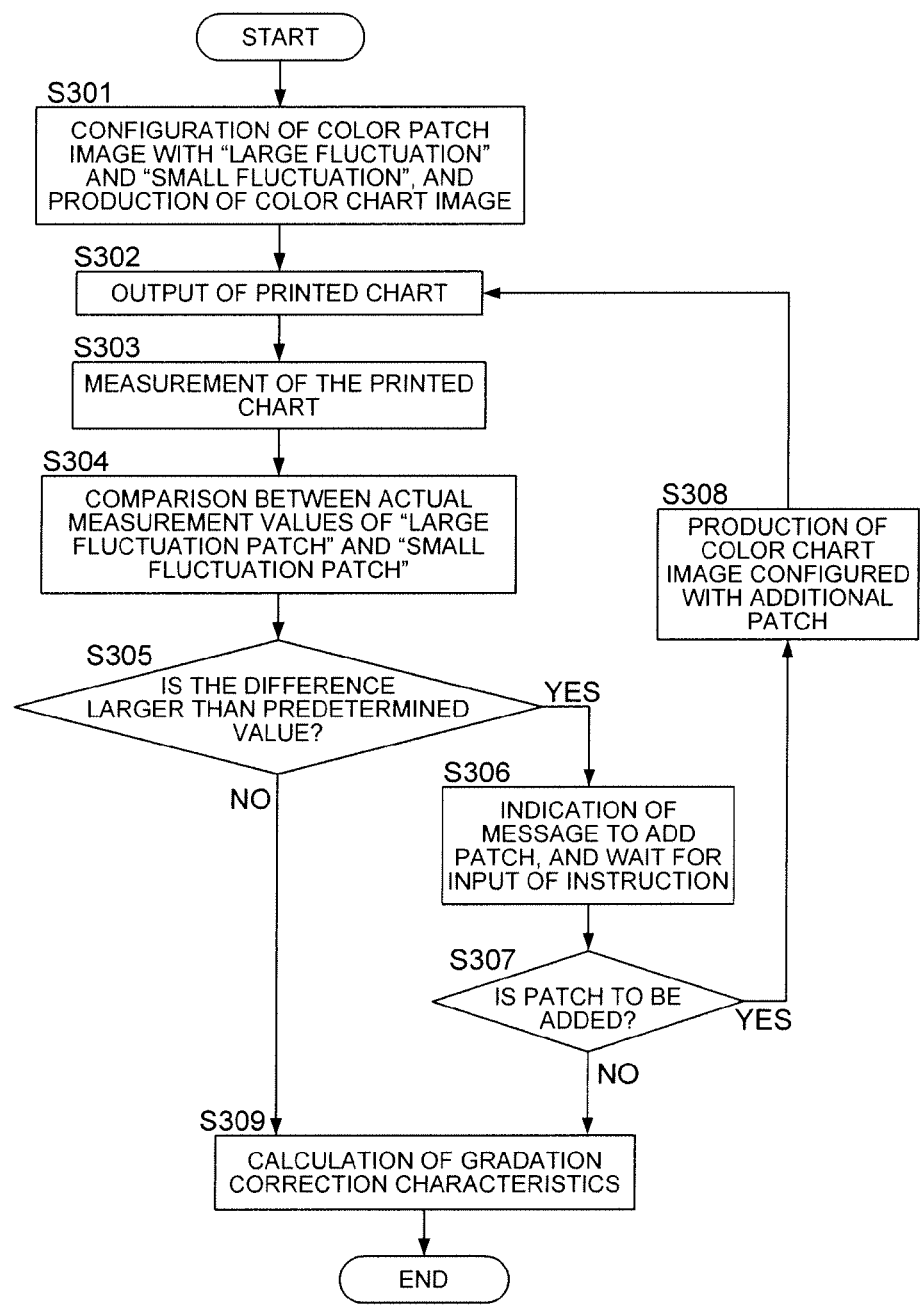
FIG. 17 is a flow chart showing a process with regard to additional patches.
Figure 18:
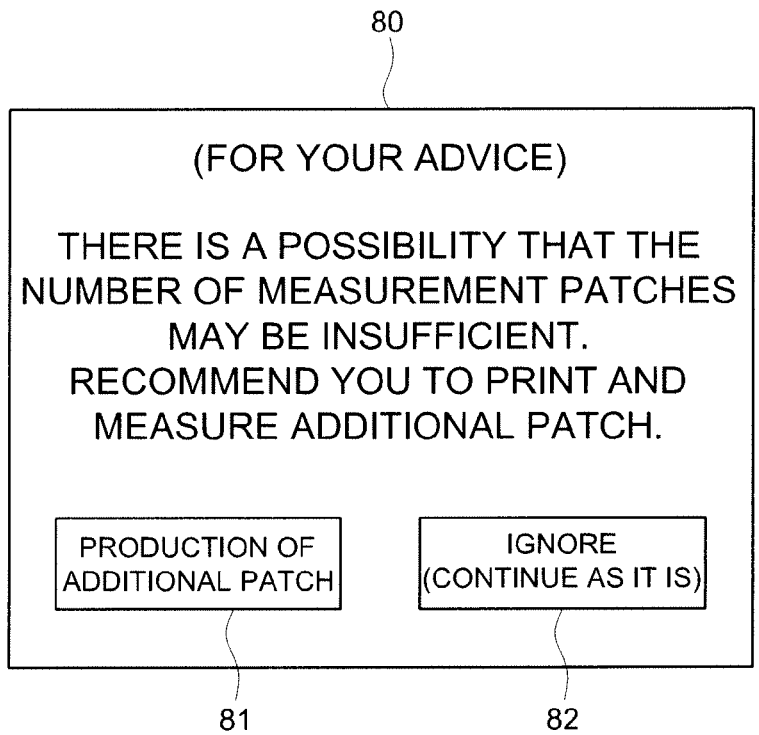
FIG. 18 is a front view showing an example of an additional patch selecting screen.

FIG. 17 shows a flow of the above-mentioned operations. Color patch images of a large fluctuation patch and a small fluctuation patch are constituted, and a color chart image including these color patch images is produced (Step S301), and a chart is printed based on this color chart image (Step S302). This chart is measured (Step S303), the actual measurement values of the corresponding large fluctuation patch and the small fluctuation patch are compared (Step S304). If the difference is larger than a predetermined value (Step S305; Yes), an additional selection screen 80 as shown in FIG. 18 is indicated on the display section 17, and an input of additional instruction will received from the instruction input section 16 (Step S306). When an "additional print preparation" button 81 is operated on the additional selecting screen 80 (Step S307; Yes), a color chart image into which a color patch image is added is produced (Step S308), and then the flow is shifted to Step S302, and the process is continued.

In the case that patches are added, it is natural that it is effective to increase the number of gradation representative values (kinds of color patch images) in the vicinity of the reference position which was observed with the large fluctuation patch and the small fluctuation patch. However, the method is not limited to the above way, for example, it may be permissible that over the gradation range of fluctuation at the large amplitude side, new gradation representative values (color patch images) are increased. This is because a possibility that the influence of discontinuous gradation has extended also to the outside of the amplitude range, is high.

In the case that a difference between each pair of large fluctuation patches and small fluctuation patches is less than a predetermined value (Step S305; No), or in the case that a "disregard" button 82 is operated on the additional selection screen 80, (Step S307; No), a gradation correction characteristic is computed from the measurement values of the current chart (Step S309), and this process is ended.

Next, an example of the utilization of detection information on the occurrence place of a tone jump will be explained.

As shown in FIG. 12 and FIG. 13, in the case that occurrence of a tone jump is predicted by the use of a gradation chart 51, if addition processing is further conducted for an image which has been converted by a gradation correction characteristic, a more smooth gradation reproduction can be expected.

Figure 19:
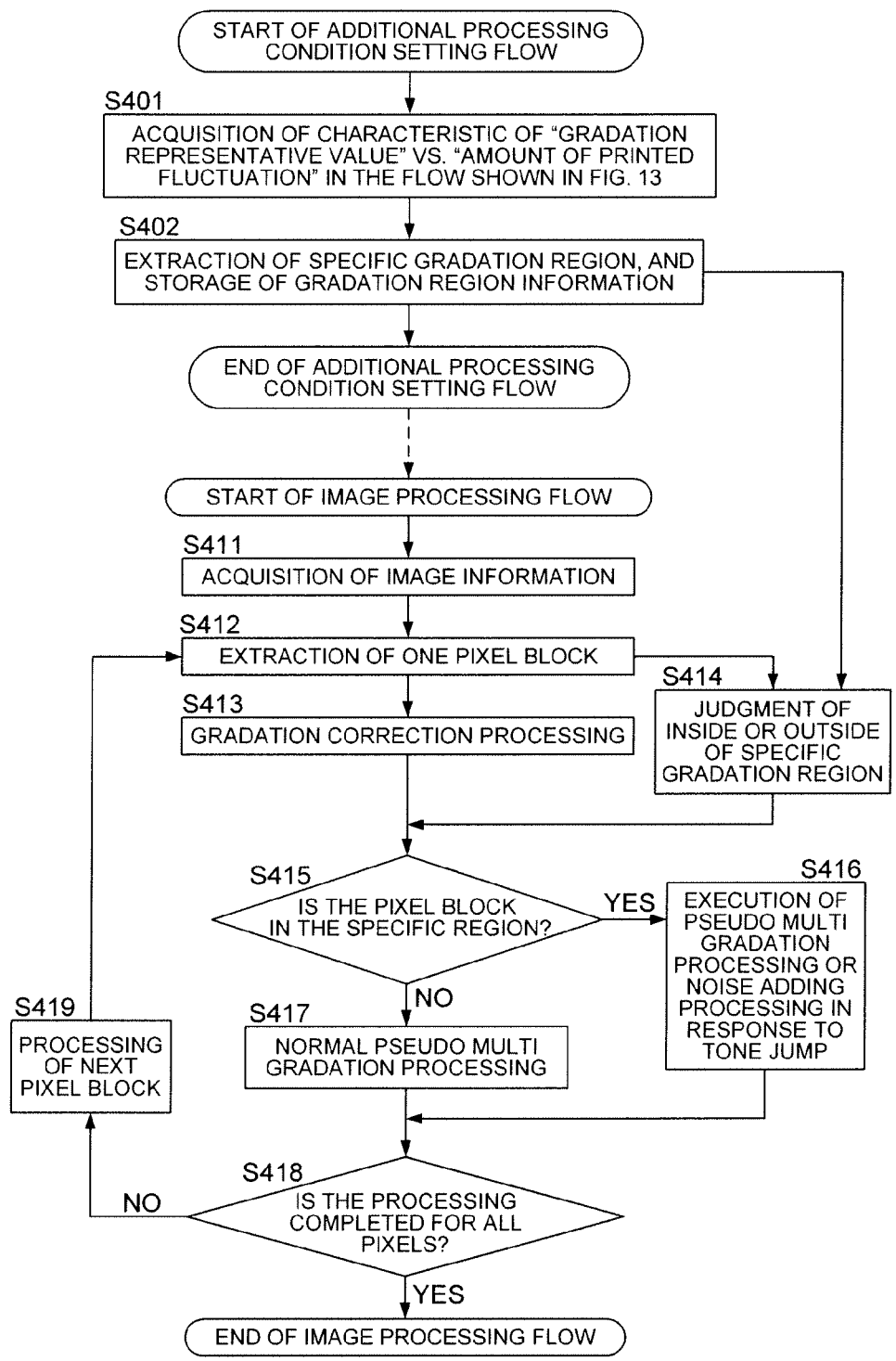
FIG. 19 is a flow chart showing a process in the case that addition processing is conducted to an image in a specific gradation region in which a tone jump is predicted.

FIG. 19 shows a flow in the case of conducting addition processing. This processing flow is divided into an additional processing condition setting process flow and an image processing flow. First, the additional processing condition setting process flow is conducted. With the methods shown from Step S201 to Step S205 in FIG. 13, a characteristic between "gradation representative value" and "amount of print fluctuation" is obtained (Step S401), and a specific gradation region where occurrence of a tone jump is predicted, is defined based on this characteristic, and then the information (gradation region information) is saved (Step S402).

Subsequently, at the time of printing predetermined image information, the image processing flow is conducted. In the image processing flow, image information of a print target is obtained (Step S411), and one pixel block is extracted out of the image shown by this image information (Step S412). For example, a region of (16 pixels×16 pixels) is made to one pixel block. The configuration and size of a pixel block may be determined based on the size of a unit region in the case of applying pseudo multi gradation.

A gradation correction processing is conducted for the extracted one pixel block (Step S413), further, the gradation representative value (for example, average gradation value) of the region of this pixel block is obtained, and whether or not this gradation representative value is included in the specific gradation region indicated by the gradation region information saved at Step S402, is judged (Step S414).

In the case that the gradation representative value is included in the specific gradation region (Step S415; Yes), the additional processing is conducted for the pixel block (Step S416). That is, the addition processing is conducted in such way that the method of a pseudo multi gradation processing is changed, or minute random number information is superposed so as to avoid the influence of a tone jump in the concerned pixel block.

For example, in the case that the number of black pixels in a pixel block is increased so as to make an image density deep, a method of pseudo multi gradation processing is adopted for the pixel block in the specific gradation region so that the occurrence of a tone jump can be suppressed. Here, the pseudo multi gradation processing is conducted in such a way that first, black pixels are increased so as to form a line, and then the number of black pixels is increased so as to make the line thick.

In the case that the pixel block is not included in the specific gradation region, the additional processing is not conducted for the concerned pixel block (Step S415; No), and a usual pseudo multi gradation processing is conducted (Step S417).

The above process is repeated for all the pixel blocks (Step S418; No, step S419), and if the process for all the pixel blocks has been completed (Step S418; Yes), then, this process will be ended. Thereafter, based on the image information to which the image processing was applied in this process, printing is conducted and a printed image is outputted.

Next, a method of conducting measurement while eliminating defective parts on a chart 20 will be explained.

At the time of obtaining characteristic information from a chart 20, a case that, for example, scratches or blemishes are caused on a patch, may be assumed. In such a case, it may be preferable to detect from image information a region which is not suitable as a measurement region due to defects such as scratches and blemishes, and to eliminate a portion of a neighboring region including the region expected to be influenced with such defects as an abnormal region from a measurement region. As methods of eliminating an abnormal region, for examples, the following two methods may be considered.

(1) In the first method, a reading step is conducted to read a chart with a document scanner 19 so as to obtain a chart image, and then an eliminating step is conducted to apply a differentiation filter to the obtained chart image and to extract edges generated in defective parts. Since a portion of a normal chart consists of only continuous gradation patterns, the output results of the differentiation filter from the portion becomes very small. As a result, only defective parts are extracted.

(2) In the second method, an image of normal gradation chart is prepared beforehand as a reference image, and a chart image obtained by a scanning step is compared with the reference image after the alignment in terms of scanning positions so as to obtain different portions.

Figure 20:
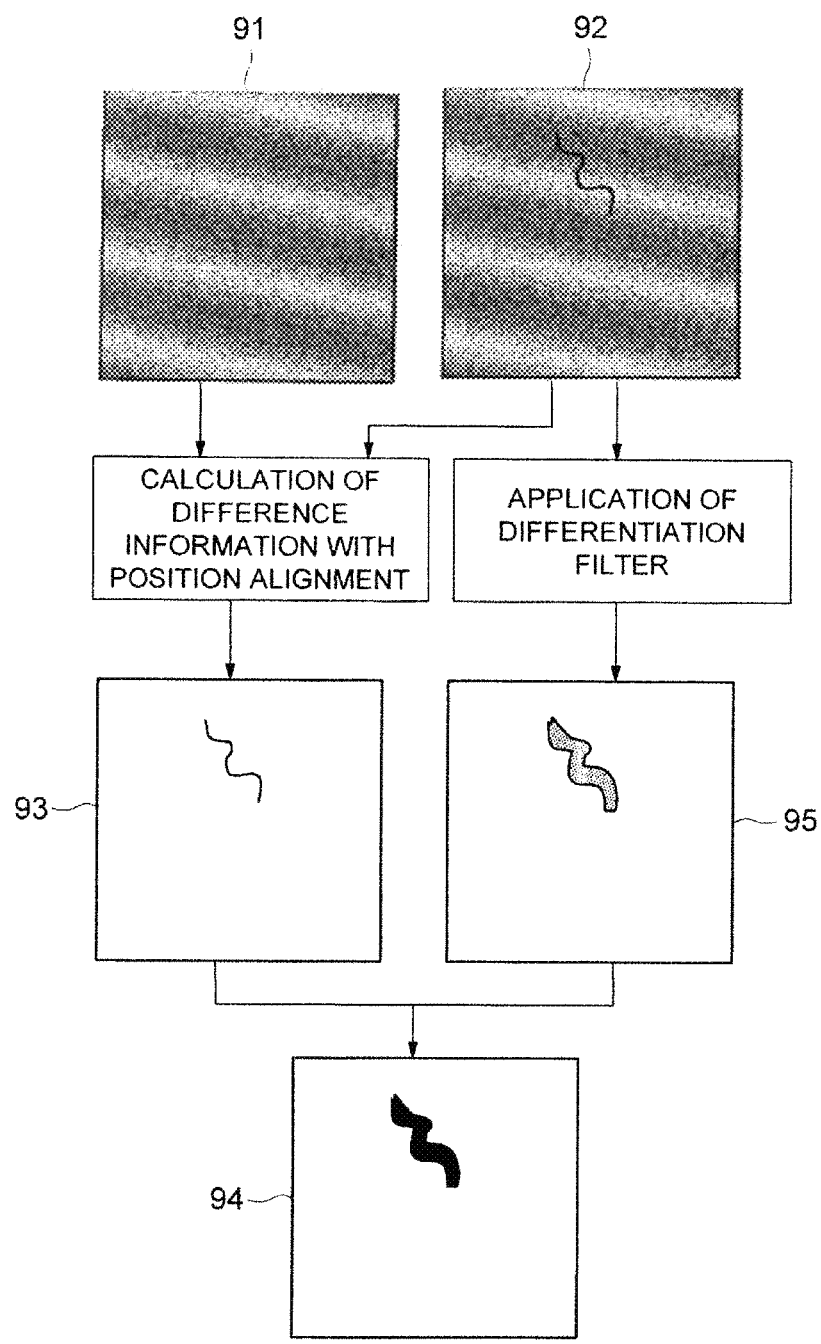
FIG. 20 is an explanatory drawing for exemplifying an extracting process of abnormal regions.
Figure 21:
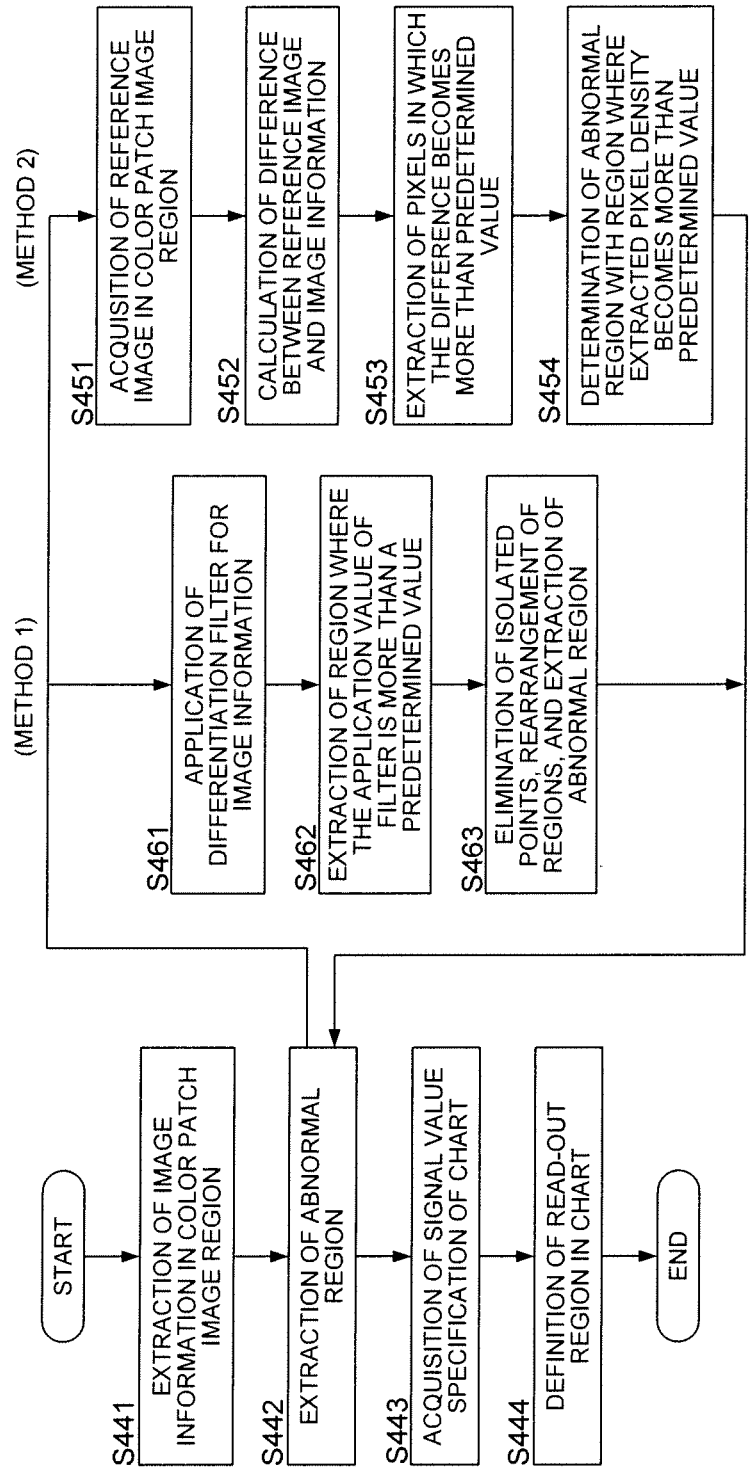
FIG. 21 is a flow chart showing a process of extracting and eliminating abnormal regions.

FIG. 20 exemplifies an extracting process of abnormal regions in the case of applying the above methods (1) and (2), and FIG. 21 shows a flow of a process of extracting and eliminating abnormal regions. Image information is read from a chart 20 with a document scanner 19, and then image information of a portion corresponding to each color patch image is extracted from the read image information (Step S441), and abnormal regions are detected from the image information (Step S442). As the detecting methods, the above-mentioned method (1) and (2) may be employed.

Now, explaining more in detail, that is, in the case of the method (2), image information (reference image) of a normal chart 91 is obtained (Step S451). Then, the normal chart 91 and a defective chart 92 with defects, such as a blemish, are aligned in terms of scanning position, and difference information between the normal chart 91 and the defective chart 92 is obtained (Step S452), subsequently, pixels in which the difference becomes larger than a predetermined value are extracted (Step S453). As a result, a different portion image 93 in which only defective parts appear (or are extracted) can be obtained. Then, a region (portion including the neighborhood of the appearing defects) in which the density of the extracted picture elements (pixels) becomes larger than a predetermined value, is made as an abnormal region 94 (Step S454).

In the case of the method (1), a differentiation filter is applied to image information of a defective chart 92 (Step S461), and regions in which a filter application value is larger than a predetermined value, are extracted (Step S462). With this, a differential image 95 in which only edge portions of defects are emphasized is obtained. The differential image 95 is subjected to morphology treatment so as to eliminate isolated points, and the regions are restructured, whereby abnormal regions 94 can be obtained (Step S463).

If abnormal regions are specified, the specification of signal values of a chart 20 is obtained (Step S443), and a measurement region (partial regions used as a measurement region) is defined in the region except the abnormal regions and registered (Step S444).

Hitherto, the explanation has been made about the case where the gradation characteristic of a printer is obtained by the measurement of a printed-out chart. However, in the case that a printer is an electro-photographic type, the measurement can be made without printing a chart.

Figure 22:
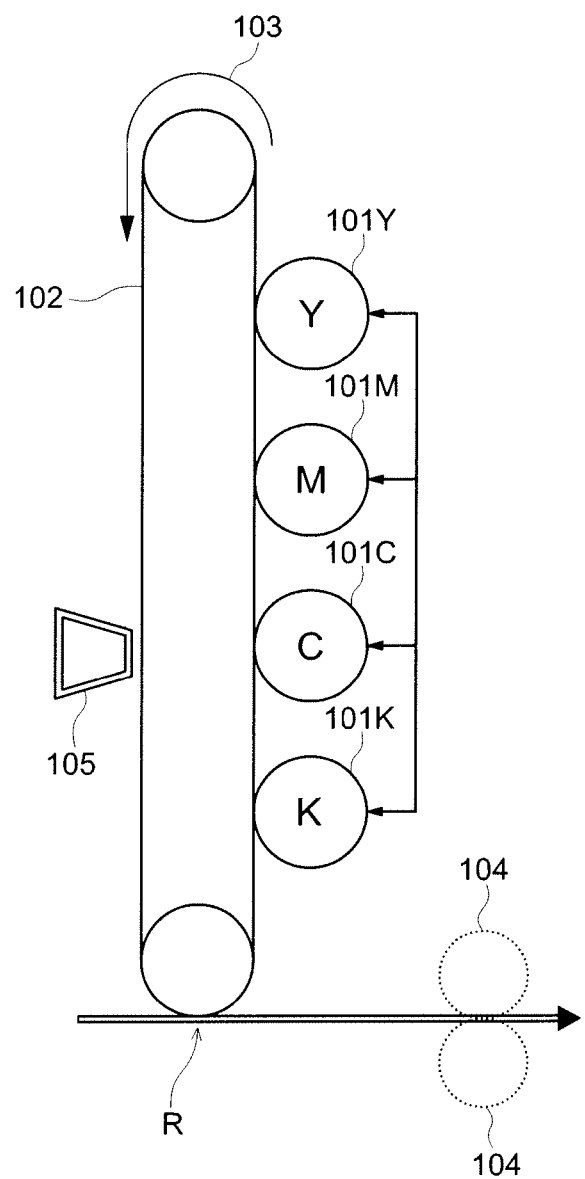
FIG. 22 is an explanatory drawing showing a basic constitution of a tandem type color printer with an electro-photographic system.
Figure 23:
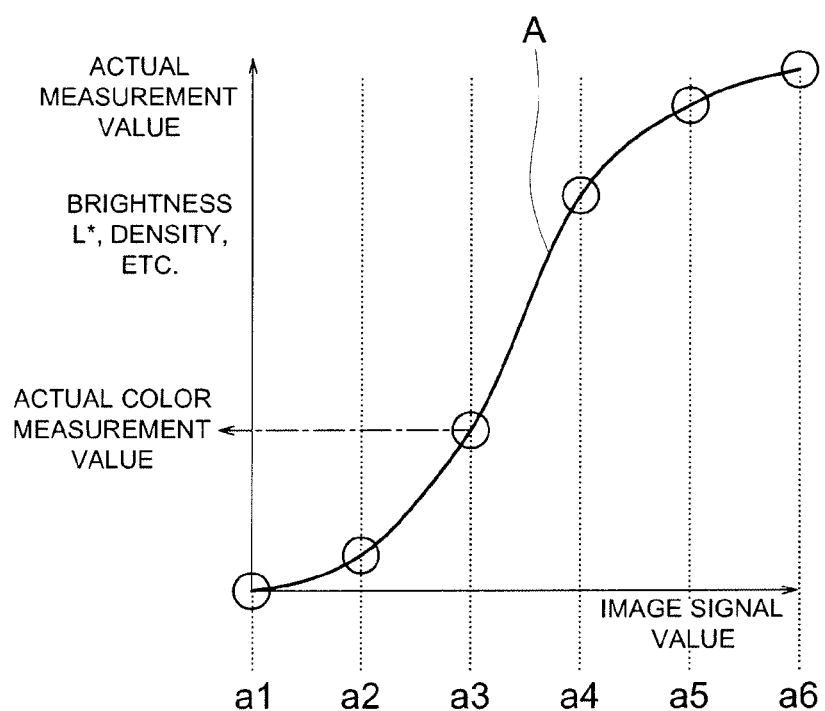
FIG. 23 is a drawing showing an example of the gradation characteristic of a monochromatic printer obtained by an interpolation.
Figure 24:
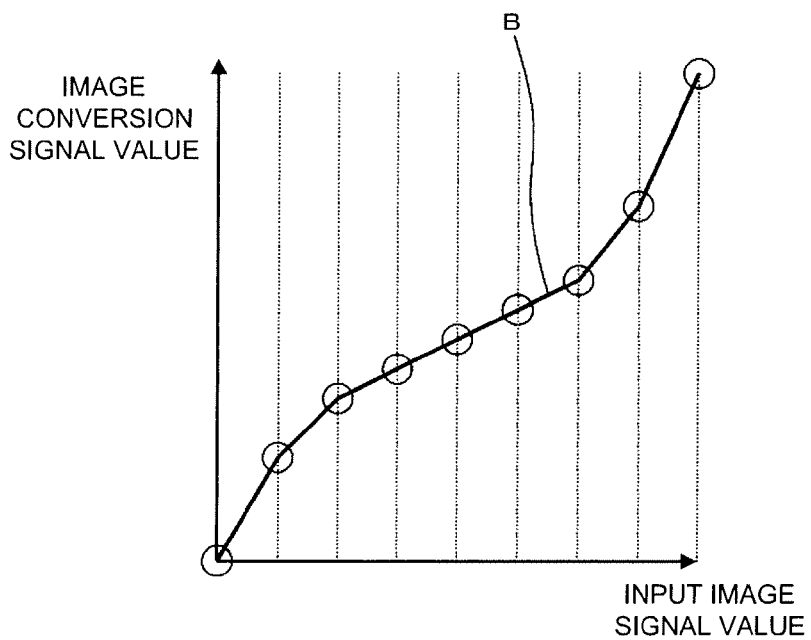
FIG. 24 is a drawing showing an example of a gradation correction characteristic produced based on the gradation characteristic of a printer.
Figure 25:
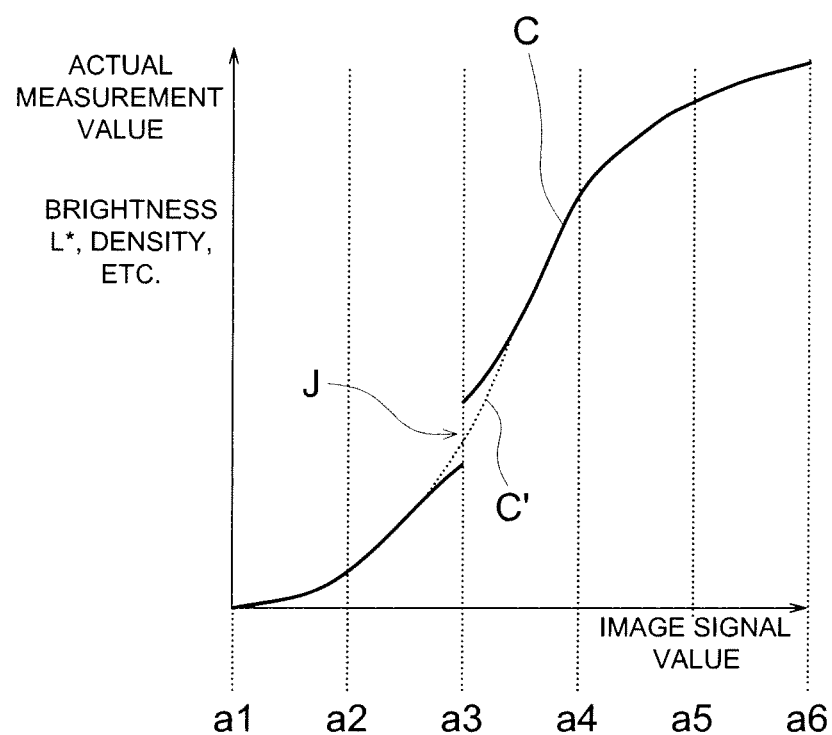
FIG. 25 is a drawing showing an example of the gradation characteristic of a printer in which a tone jump occurs.

In an image forming apparatus, such as a tandem type color copying machine using an electro-photographic process as shown in FIG. 22, photoreceptor drums 101Y, 101M, 101C, and 101K and image forming sections (not illustrated in the drawing) are arranged for color components of yellow (Y), magenta (M), cyan (C), and black (K) along an endless belt-shaped intermediate transfer member 102 which rotates in the arrowed mark direction 103. On the photoreceptor drums 101Y, 101M, 101C and 101K for each color, toner images of corresponding colors are formed respectively by the image forming sections (not illustrated in the drawing). These toner images are transferred one by one and superimposed on the rotating intermediate transfer member 102, and a color toner image is formed on the intermediate transfer member 102. The color toner image formed on the intermediate transfer member 102 is transferred onto a sheet of paper at a transfer position R, and then, when this sheet of paper passes between rollers of a fixing device 104, the color toner image is applied with pressure heat, whereby the color toner image is fixed on the sheet of paper.

If the printer section 13 is such a type, when a toner before being fixed to a sheet of paper, for example, an image on the intermediate transfer member 102 is measured directly with a toner measuring section 105, the use of paper for unnecessary usage can be suppressed. In this case, it may be considered that the extent of coloring of toner differs between the condition of toner formed on the intermediate transfer member 102 and the condition of toner actually having been fixed on a sheet of paper. Therefore, for example, a gradation correction is prepared by the use of a printed chart, and a correction may be conducted for color fluctuation occurred later based on the prepared gradation correction by this method.

Here, explained more in detail, that is, gradation adjustment is conducted once by the use of a printed chart 20, and then a toner image of the same chart 20 of the above printed chart is formed on the intermediate transfer member 102. Successively, the coloring condition of the toner on the intermediate transfer member 102 on the above condition is measured, and this measurement result is recorded as a reference condition. After that, gradation correction may be conducted so as to conform with this reference condition with the method of not outputting a toner image onto a sheet of paper (method of measuring a toner image of a chart formed on the intermediate transfer member 102).

The above-mentioned embodiments are summarized into the following technical features.

(1) In a printer gradation correcting method which measures an output color patch image outputted from a printer based on image data of a color patch image with a color measuring section, and corrects the output gradation of the printer based on the measurement results, the printer gradation correcting method is characterized in that (1) the color patch image is made such that fluctuation of a gradation value of a predetermined color component is added to a patch image having a predetermined gradation representative value and the total of the fluctuation added in a measurement region of the color measuring section becomes a predetermined value, and (2) the output gradation of the printer is corrected based on the gradation representative value, the predetermined value and the measurement results of the measurement region by the color measuring section.

According to the above-mentioned technique, the output gradation of the printer is corrected by the use of the color patch image in which fluctuation of a gradation value of a predetermined color component is added to a patch image having a predetermined gradation representative value. The fluctuation is systematically added such that the total of the fluctuation in a measurement region becomes the predetermined value. Further, the fluctuation is made in a form such as change in gradation values of a predetermined color component, or vibration, and a gradation distribution within a gradation range of fluctuation is provided to one color patch image. Therefore, the measurement value of an output color patch image obtained by the printing of the color patch image including fluctuation becomes a value in which the gradation characteristic of the printer in the neighboring gradation (gradation range of fluctuation) of a gradation representative value is expressed averagely. Therefore, even if a tone jump and the like occur in the vicinity of the gradation representative value, the influence of the tone jump is equalized by the use of this color patch image, whereby it becomes possible to obtain and adjust stable printer characteristics.

Since the fluctuation is systematically added such that the total of the fluctuation in a measurement region becomes the predetermined value, the average gradation value of the measurement region in the color patch image becomes a value that the predetermined value of the total of the fluctuation is added to the gradation representative value of the patch image. The gradation characteristic of a printer is recognized from this gradation value and a gradation value of a measurement result of an output color patch image, whereby correction is conducted. If fluctuation is added especially such that the total of the fluctuation in a measurement region becomes 0, it will become a desirable embodiment. That is, if the total of the fluctuation is set to 0, the average gradation value in the measurement region of a color patch image becomes to conform to the gradation representative value of the patch image. Therefore, it is possible to correct the gradation characteristic of a printer based on the gradation representative value of the patch image and a gradation value of a measurement result of an output color patch image.

(2) The printer gradation correcting method described in (1) is characterized in that the fluctuation is a stripe pattern in which the cycle of the stripe pattern is set up in accordance with the shape of the measurement region.

According to the above-mentioned technique, the fluctuation is made in the form of a stripe pattern and the cycle of the stripe pattern is set up in accordance with the shape of the measurement region. Therefore, change in the total of fluctuation depending on the measuring position in an output color patch image can be made small, whereby measurement with high precision can be conducted out without the necessity to define and regulate the measuring position strictly.

(3) The printer gradation correcting method described in (1) or (2) is characterized in that an index for recognizing a measuring position is set up on the chart including the output color patch image, and the measuring section measures a measurement region at a position recognized based on the index.

According to the above-mentioned technique, the measurement region of the measuring section can be correctly aligned to an output color patch image on the basis of the index. With this, since measurement can be conducted with high accuracy, it is possible to provide a degree of freedom in providing fluctuation (patters). Therefore, it makes possible to realize a chart structure with good appearance as a chart for a user's adjustment. As the index, specific marks (crossed lines and a specific pattern for distinction) provided in the chart may be sufficient, and edges of a color patch and the like may be also sufficient.

(4) The printer gradation correcting method described in any one of (1) to (3) is characterized in that the amplitude of the fluctuation is made one third (⅓) or more of a unit cell gradation difference of a gradation correction look-up table.

According to the above-mentioned technique, the amplitude of the fluctuation is made one third (⅓) or more of a unit cell gradation difference of a gradation correction look-up table, the print characteristic in intermediate regions among the representative values arranged in the form of lattice in a signal value space can be obtained without excess and deficiency, whereby equalization of a characteristic can be conducted effectively.

(5) The printer gradation correcting method described in any one of (1) to (4) is characterized in that the fluctuation is shaped in the form of stripes or lattice patterns, and the direction of the fluctuation is set up in accordance with the characteristic of the printer.

According to the above-mentioned technique, for example, when the stripes are arranged in the direction not conforming to screen angle of a printer, cyclic interferential actions between the screen and the stripe can be reduced, whereby it becomes possible to obtain stable printouts and measurement results. The characteristic of a printer includes not only a screen angle but also various kinds of characteristics having a possibility to interfere with fluctuation.

(6) The printer gradation correcting method described in any one of (1) to (5) is characterized in that the amplitude of the fluctuation is made larger relatively in the vicinity of gradation values where a tone jump in connection with the color component of the fluctuation in the printer is predicted.

According to the above-mentioned technique, when the amplitude of the fluctuation is made larger in a gradation region requiring the equalization especially, it becomes possible to obtain more stable correction effect with less occurrence of side effect.

(7) The printer gradation correcting method described in (6) is characterized in that a test chart is outputted by the printer based on the image data of a test image in which fluctuation of the color component is added to a gradation pattern in connection with a predetermined color component, the test chart is measured, the relationship between the gradation value of the gradation pattern and the size of the amplitude of the fluctuation in the gradation value is obtained from the measurement result, and a gradation value on which a tone jump occurs in the printer in connection with the color component is obtained from this relationship.

According to the above-mentioned technique, since the amplitude of fluctuation is made larger in a gradation region where a tone jump has occurred at the time of printing out an image, it is possible to grasp easily a region where a torn jump tends to occur, that is, a region requiring a large equalization at the time of obtaining a gradation characteristic, from the relationship between the gradation value of a gradation pattern and the amplitude of fluctuation measured in connection with the gradation value. If a gradation region where a tone jump occurs can be grasped, a suitable amplitude of fluctuation can be set up for each gradation, or a gradation representative value to be measured can be set up, whereby the subsequent measurement will become easy.

(8) The printer gradation correcting method described in (7) is characterized in that among the regions of the gradation pattern in the test chart, a region where a discontinuous point exists is not made as a measurement region.

According to the above-mentioned technique, since dust, dirt, blemish, and the like placed on a printed gradation pattern appear as discontinuous points on the gradation pattern, a region where discontinuous points exist is not made to a measurement region, whereby the influence of poor noises is hardly received and correction result can be obtained easily and stably.

(9) The printer gradation correcting method described in any one of (1) to (8) is characterized in that two kinds of output color patch images are outputted by the printer based on the image data of two kinds of color patch images which have respective different amplitude of fluctuation and the same average gradation value of fluctuation in the measurement region and the outputted two kinds of output color patch images are measured, and the number of kinds of color patch images is increased in accordance with a difference in the measurement results with regard to the color component of fluctuation.

According to the above-mentioned technique, since the average gradation value of fluctuation included in the measurement region is the same between the two kinds of color patch images, if the gradation characteristic of the printer is linear in the gradation range of large fluctuation amplitude, even if there is a difference such as large or small in amplitude, the measurement results becomes the same between the two kinds of output color patch images. On the other hand, if the gradation characteristic of the printer is greatly nonlinear or there is a tone jump within its gradation range, a difference appears between both of the measurement results. Then, in the case that the difference between the measurement results of the two kinds of output color patch images becomes larger than a predetermined value, additional color patches may be set up. The set-up of the additional color patches may be conducted automatically or conducted upon receipt of a user's authorization.

(10) The printer gradation correcting method described in any one of (7) to (9) is characterized in that a gradation region in which a tone jump appears is recognized based on the measurement result and a predetermined additional processing is applied to image data in the region after gradation correction.

According to the above-mentioned technique, when an additional processing to reduce a tone jump is conducted for a region requiring the equalization of the gradation characteristic, it become possible to conduct correction from which a more desirable printed result can be obtained.

(11) The printer gradation correcting method described in (10) is characterized in that the additional processing includes at least one of the modification of a pseudo multi gradation processing method and a random number providing process.

According to the above-mentioned technique, when the modification of a pseudo multi gradation processing method (for example, the change from the area modulation to the frequency modulation, the change of pattern in a dither matrix, the switch of screen patterns, the change from the screen treatment to the error diffusion treatment, and the like) and a random number providing process are conducted, the simple and effective additional processing can be conducted.

(12) The printer gradation correcting method described in any one of (1) to (11) is characterized in that the amplitude of fluctuation is set up in accordance with the visual characteristic for the gradation region where the fluctuation exists.

According to the above-mentioned technique, for example, in a high saturation hue of green in a L*a*b* color coordinate system, or in a region where change of visual perception is little for change of a signal value, such as fluctuation due to a tone change not accompanying a large luminance change and the like, the tolerance to a measurement error having a possibility to be caused by "fluctuation" of signal values can be set up greatly, so that larger "fluctuation" can be provided. With this, the gradation value in the concerned region can be obtained more stably, whereby correction effect with more stability can be obtained with the less occurrence of side effect.

(13) The printer gradation correcting method described in any one of (1) to (12) is characterized in that among the output color patch images, a region where a discontinuous point exists is not made to a measurement region.

According to the above-mentioned technique, since dust, dirt, blemish, and the like placed on a printed output color patch image appear as discontinuous points on the output color patch image, a region where discontinuous points exist is not made to a measurement region, whereby the influence of poor noises is hardly received and correction result can be obtained easily and stably.

(14) A color patch image is characterized to be structured such that fluctuation of a gradation value of a predetermined color component is added to a patch image having a predetermined gradation representative value and the total of the fluctuation added in a measurement region of a predetermined color measuring section becomes a predetermined value.

According to the above-mentioned technique, the fluctuation is made in a form such as change in gradation values of a predetermined color component, or vibration, and a gradation distribution within a gradation range of fluctuation is provided to one color patch image. Further, the fluctuation is systematically added such that the total of the fluctuation in a measurement region becomes the predetermined value. When this color patch image is printed and measured, the measurement value becomes a value in which the gradation characteristic of the printer in the neighboring gradation (gradation range of fluctuation) of a gradation representative value is expressed averagely. Therefore, even if a tone jump and the like occur in the vicinity of the gradation representative value, the influence of the tone jump is equalized, whereby it becomes possible to obtain and adjust stable printer characteristics. Herein, the color patch image may be image data or a color patch image printed on a sheet of paper.

Since the fluctuation is systematically added such that the total of the fluctuation in a measurement region becomes the predetermined value, the average gradation value of the measurement region in the color patch image becomes a value that the predetermined value of the total of the fluctuation is added to the gradation representative value of the patch image. The gradation characteristic of a printer is recognized from this gradation value and a gradation value of a measurement result of an output color patch image, whereby correction is conducted. If fluctuation is added especially such that the total of the fluctuation in a measurement region becomes 0, it will become a desirable embodiment. That is, if the total of the fluctuation is set to 0, the average gradation value in the measurement region of a color patch image becomes to conform to the gradation representative value of the patch image. Therefore, it is possible to correct the gradation characteristic of a printer based on the gradation representative value of the patch image and a gradation value of a measurement result of an output color patch image.

According to the printer gradation correcting method related to the present invention, the influence of a tone jump and the like can be suppressed to little and the gradation correction of a printer can be conducted. Moreover, according to the color patch image related to the present invention, it is possible to obtain the measurement value in which the influence of the tone jump and the like caused in the vicinity of the gradation representative value has been equalized.

As mentioned above, the embodiments of the present invention has been explained with reference to the drawing. However, the present invention is not limited to the exemplified embodiments. Even if modification or addition is made in a range that it does not deviate from the gist of the present invention, such modification or addition is included in the scope of the present invention.

What is claimed is:

1. A printer gradation correcting method, comprising the steps of:
outputting a plurality of color patch images different in gradation on a recording medium by a printer based on image data of a plurality of color patch images;

measuring a gradation of each of the plurality of outputted color patch images by a color measuring device so as to obtain a plurality of different gradation measurement values; and correcting a gradation characteristic of the printer based on the plurality of different gradation measurement values;

wherein each of the plurality of color patch images includes a patch-shaped image having a uniform gradation of a predetermined gradation representative value different from other color patch images and gradation fluctuation added in the patch-shaped image, and the added gradation fluctuation includes high gradation components each having a gradation value higher than the predetermined gradation representative value and low gradation components each having a gradation value lower than the predetermined gradation representative value and is configured such that a total gradation value of the high gradation components and the low gradation components measured in a measurement region by the color measuring device becomes a predetermined value, and wherein when the gradation characteristic of the printer is corrected, the gradation value of at least one of the plurality of color patch images is determined based on the gradation representative value, the predetermined value of the total gradation value of the high gradation components and the low gradation components, and the gradation measurement value.

2. The printer gradation correcting method described in claim 1, wherein the gradation fluctuation is a stripe pattern in which a cycle of the stripe pattern is determined in accordance with a shape of the measurement region.

3. The printer gradation correcting method described in claim 1, wherein the color patch image is structured so as to be printed together with plural color patch images on a color chart on which a guide mark to determine a position of a measuring region is provided, and the color measuring device is adapted to measure a measurement region determined based on the guide mark and obtains a gradation measurement value on the color patch image.

4. The printer gradation correcting method described in claim 1, wherein the color patch image is structured so as to be printed together with plural color patch images on a color chart, and the amplitude of gradation fluctuation to be added into the color patch image is one third or more of a gradation difference between the color patch image and a neighboring color patch image of the color patch image.

5. The printer gradation correcting method described in claim 1, wherein the gradation fluctuation is a stripe or a lattice pattern and an orientation of gradation fluctuation is set in accordance with characteristics of the printer.

6. The printer gradation correcting method described in claim 1, wherein a gradation pattern image is outputted by the printer based on gradation pattern image data added with gradation fluctuation of a predetermined color component, the outputted gradation pattern image is measured by the color measuring device so as to obtain an amplitude of gradation fluctuation for each gradation value, and a gradation value to cause a tone jump of the predetermined color component is determined based on the size of the amplitude of each gradation value.

7. The printer gradation correcting method described in claim 6, wherein the amplitude of gradation fluctuation is made larger relatively in the vicinity of a gradation value predicted to cause a tone jump in the gradation characteristic of the printer.

8. The printer gradation correcting method described in claim 6, wherein when there is a region including discontinuous points in a different portion image between a standard image of a gradation chart image and the outputted gradation chart image or in a differential image of the outputted gradation chart image, the region is not made as the measurement region by the measuring device.

9. The printer gradation correcting method described in claim 1, wherein two kinds of color patch images having the same gradation representative value and different respective amplitudes of gradation fluctuations are outputted by the printer, and whether or not the number of kinds of color patch images is to be increased is determined in accordance with a difference in measurement values between the outputted two kinds of color patch images.

10. The printer gradation correcting method described in claim 6, wherein a gradation region in which a tone jump appears is recognized based on the measurement results, and image data in the gradation region is applied with additional processing after the correction of gradation.

11. The printer gradation correcting method described in claim 10, wherein the additional processing includes at least one of a change of a pseudo multi gradation processing method and random number addition processing.

12. The printer gradation correcting method described in claim 1, wherein amplitude of gradation fluctuation is set in accordance with a visual characteristic for a gradation region where the gradation fluctuation exists.

13. The printer gradation correcting method described in claim 1, wherein when there is a region including discontinuous points in a different portion image between a standard image of a color patch image and the outputted color patch image or in a differential image of the outputted color patch image, the region is not made as the measurement region by the measuring device.

14. A color patch image, comprising:
a plurality of color patch images which are different in gradation and formed on a recording medium,
wherein each of the plurality of color patch images includes:
a patch-shaped image having a uniform gradation of a predetermined gradation representative value different from other color patch images; and
gradation fluctuation added in the patch-shaped image,
wherein the added gradation fluctuation includes high gradation components each having a gradation value higher than the predetermined gradation representative value and low gradation components each having a gradation value lower than the predetermined gradation representative value and is configured such that a total gradation value of the high gradation components and the low gradation components measured in a measurement region by the color measuring device becomes a predetermined value.

15. A printer gradation correcting method, comprising the steps of:
outputting a color patch image by a printer based on image data of a color patch image;
measuring a gradation of the outputted color patch image by a color measuring device so as to obtain a gradation measurement value; and
correcting a gradation characteristic of the printer based on the gradation measurement value;
wherein the color patch image includes a patch-shaped image having a uniform gradation of a predetermined gradation representative value and gradation fluctuation of a predetermined color component added in the patch-shaped image, and the added gradation fluctuation is structured such that a total of gradation fluctuation measured in a measurement region by the color measuring device becomes a predetermined value, wherein the gradation characteristic of the printer is corrected based on the gradation representative value, the predetermined value of the total of gradation fluctuation, and the gradation measurement value, and wherein a gradation pattern image is outputted by the printer based on gradation pattern image data added with gradation fluctuation of a predetermined color component, the outputted gradation pattern image is measured by the color measuring device so as to obtain an amplitude of gradation fluctuation for each gradation value, and a gradation value to cause a tone jump of the predetermined color component is determined based on the size of the amplitude of each gradation value.

16. The printer gradation correcting method described in claim 15, wherein the amplitude of gradation fluctuation is made larger relatively in the vicinity of a gradation value predicted to cause a tone jump in the gradation characteristic of the printer.

17. The printer gradation correcting method described in claim 15, wherein when there is a region including discontinuous points in a different portion image between a standard image of a gradation chart image and the outputted gradation chart image or in a differential image of the outputted gradation chart image, the region is not made as the measurement region by the measuring device.

18. The printer gradation correcting method described in claim 15, wherein a gradation region in which a tone jump appears is recognized based on the measurement results, and image data in the gradation region is applied with additional processing after the correction of gradation.

19. The printer gradation correcting method described in claim 18, wherein the additional processing includes at least one of a change of a pseudo multi gradation processing method and random number addition processing.

20. A printer gradation correcting method, comprising the steps of:

outputting a color patch image by a printer based on image data of a color patch image;

measuring a gradation of the outputted color patch image by a color measuring device so as to obtain a gradation measurement value; and correcting a gradation characteristic of the printer based on the gradation measurement value;

wherein the color patch image includes a patch-shaped image having a uniform gradation of a predetermined gradation representative value and gradation fluctuation of a predetermined color component added in the patch-shaped image, and the added gradation fluctuation is structured such that a total of gradation fluctuation measured in a measurement region by the color measuring device becomes a predetermined value, wherein the gradation characteristic of the printer is corrected based on the gradation representative value, the predetermined value of the total of gradation fluctuation, and the gradation measurement value, and wherein two kinds of color patch images having the same gradation representative value and different respective amplitudes of gradation fluctuations are outputted by the printer, and whether or not the number of kinds of color patch images is to be increased is determined in accordance with a difference in measurement values between the outputted two kinds of color patch images.

21. A printer gradation correcting method, comprising the steps of:

outputting a color patch image by a printer based on image data of a color patch image;

measuring a gradation of the outputted color patch image by a color measuring device so as to obtain a gradation measurement value; and correcting a gradation characteristic of the printer based on the gradation measurement value;

wherein the color patch image includes a patch-shaped image having a uniform gradation of a predetermined gradation representative value and gradation fluctuation of a predetermined color component added in the patch-shaped image, and the added gradation fluctuation is structured such that a total of gradation fluctuation measured in a measurement region by the color measuring device becomes a predetermined value, wherein the gradation characteristic of the printer is corrected based on the gradation representative value, the predetermined value of the total of gradation fluctuation, and the gradation measurement value, and wherein when there is a region including discontinuous points in a different portion image between a standard image of a color patch image and the outputted color patch image or in a differential image of the outputted color patch image, the region is not made as the measurement region by the measuring device.

* * * * *